US008619412B2

(12) United States Patent
Ewing et al.

(10) Patent No.: US 8,619,412 B2
(45) Date of Patent: Dec. 31, 2013

(54) POWER DISTRIBUTION UNIT AND METHODS OF MAKING AND USE INCLUDING MODULAR CONSTRUCTION AND ASSEMBLIES

(76) Inventors: Carrel W. Ewing, Reno, NV (US);
Andrew J. Cleveland, Reno, NV (US);
James P. Maskaly, Sparks, NY (US);
Dave Greenblat, Carson City, NV (US);
Brandon W. Ewing, Reno, NV (US)

(*) Notice: Subject to any disclaimer, the term of this patent is extended or adjusted under 35 U.S.C. 154(b) by 67 days.

(21) Appl. No.: 13/195,838

(22) Filed: Aug. 1, 2011

(65) Prior Publication Data
US 2012/0081842 A1 Apr. 5, 2012

Related U.S. Application Data

(63) Continuation of application No. 12/767,706, filed on Apr. 26, 2010, now Pat. No. 7,990,689, which is a continuation of application No. 12/277,560, filed on Nov. 25, 2008, now Pat. No. 7,706,134, which is a continuation of application No. 11/653,098, filed on Jan. 11, 2007, now Pat. No. 7,457,106, which is a continuation-in-part of application No. 11/636,263, filed on Dec. 7, 2006, now Pat. No. 7,447,002, and a continuation-in-part of application No. 11/636,262, filed on Dec. 7, 2006, now Pat. No. 7,675,739.

(60) Provisional application No. 60/852,726, filed on Oct. 18, 2006, provisional application No. 60/758,394, filed on Jan. 11, 2006.

(51) Int. Cl.
*H02B 1/26* (2006.01)
*G02B 21/00* (2006.01)

(52) U.S. Cl.
USPC ........... 361/622; 361/111; 361/118; 361/623; 361/644; 340/531; 340/635; 340/656; 439/55; 439/65; 439/214

(58) Field of Classification Search
USPC ............ 361/62–64, 111, 118, 602, 608, 609, 361/622–628, 642–648, 656, 727, 833, 361/856; 307/39, 10.1, 112, 29, 150, 38, 307/41, 115, 125, 126, 141, 141.4, 143; 340/635, 638, 664, 656, 657, 660; 439/214, 620.08, 620.22; 312/165.1, 312/223.2, 223.3, 265.5
See application file for complete search history.

(56) References Cited

U.S. PATENT DOCUMENTS

| | | | | |
|---|---|---|---|---|
| 4,867,701 A * | 9/1989 | Wiand | .......................... | 439/501 |
| 5,650,771 A * | 7/1997 | Lee | .............................. | 340/656 |
| 5,721,934 A * | 2/1998 | Scheurich | ..................... | 713/320 |
| 6,045,399 A * | 4/2000 | Yu | ................................. | 439/502 |
| 6,476,523 B1 * | 11/2002 | Lee | .............................. | 307/141 |
| 7,141,891 B2 * | 11/2006 | McNally et al. | ................ | 307/39 |

(Continued)

*Primary Examiner* — Michail V Datskovskiy
(74) *Attorney, Agent, or Firm* — Holland & Hart LLP

(57) ABSTRACT

Described herein are various embodiments of a power distribution unit having modular components. For example, according to one embodiment, a power distribution unit can include a component portion that comprises at least two modules including outlet modules, circuit protection modules, power input modules, communications I/O modules, and display modules. Each of the at least two modules of the component portion can comprise at least one connection element and can be removably secured to one or more other of the at least two modules via the connection elements. The power distribution unit can also include a housing that defines an interior cavity. The component portion can be removably secured to the housing at least partially within the interior cavity.

6 Claims, 17 Drawing Sheets

(56) References Cited

U.S. PATENT DOCUMENTS

| | | | |
|---|---|---|---|
| 7,193,830 B2 * | 3/2007 | Fournier et al. | 361/111 |
| 7,275,947 B2 * | 10/2007 | Hartel et al. | 439/215 |
| 7,522,036 B1 * | 4/2009 | Preuss et al. | 340/531 |
| 2005/0036258 A1 * | 2/2005 | Ma et al. | 361/103 |
| 2005/0101193 A1 * | 5/2005 | Godard | 439/652 |
| 2007/0006603 A1 * | 1/2007 | Reusche et al. | 62/196.4 |
| 2007/0072476 A1 * | 3/2007 | Milan | 439/373 |

\* cited by examiner

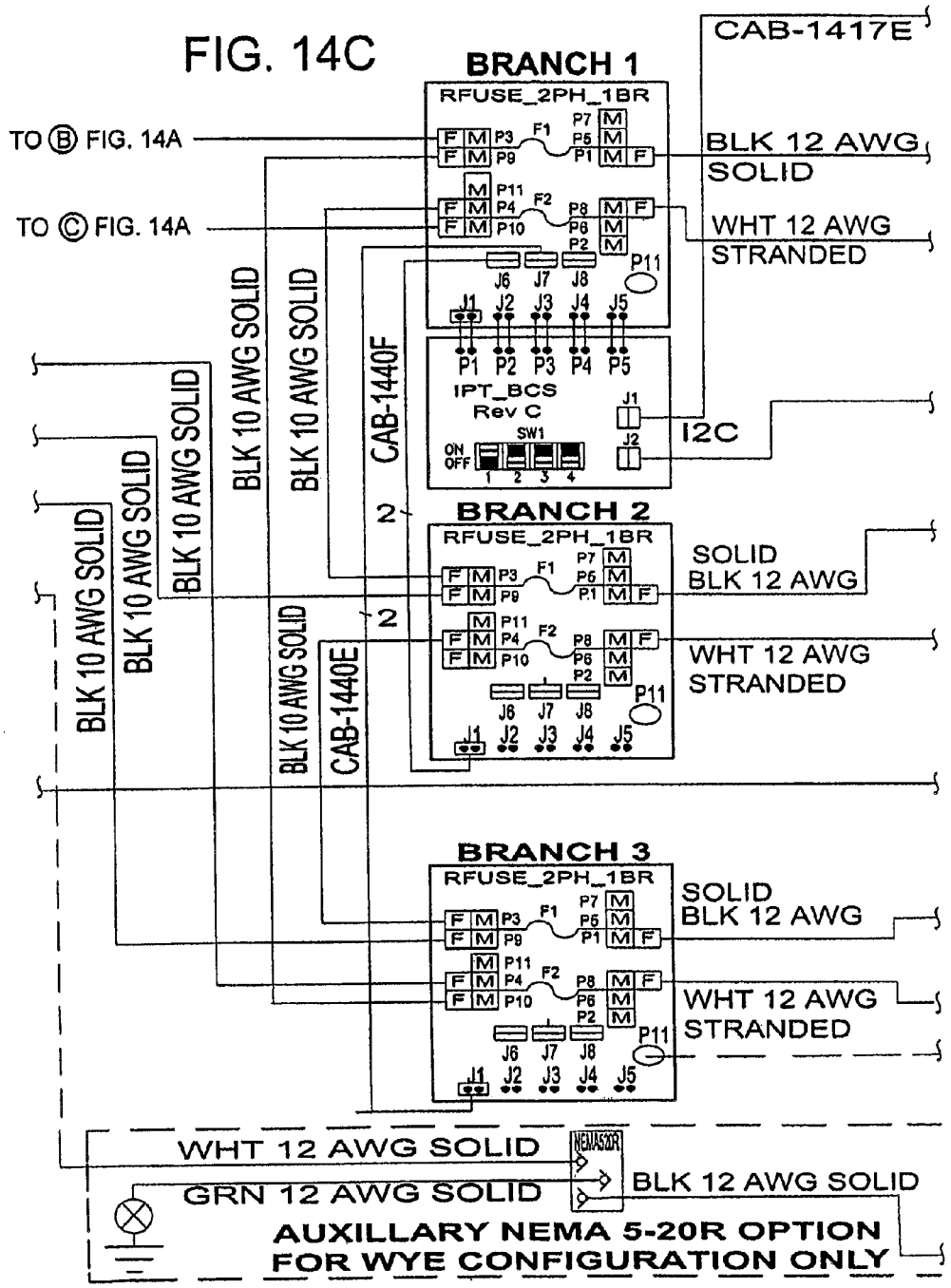

POWER DISTRIBUTION UNIT AND METHODS OF MAKING AND USE INCLUDING MODULAR CONSTRUCTION AND ASSEMBLIES

CROSS REFERENCE TO RELATED APPLICATIONS

This application is a continuation of U.S. patent application Ser. No. 12/767,706, filed Apr. 26, 2010, which is a continuation of U.S. patent application Ser. No. 11/653,098, filed Jan. 11, 2007, which is a continuation-in-part of U.S. patent application Ser. No. 11/636,262, filed Dec. 7, 2006, and U.S. patent application Ser. No. 11/636,263, filed Dec. 7, 2006, and claims the benefit of U.S. Provisional Patent Application No. 60/758,394, filed Jan. 11, 2006, and U.S. Provisional Patent Application No. 60/852,726, filed Oct. 18, 2006. These applications are incorporated herein by reference.

BACKGROUND

Power distribution units (PDU) have long been widely utilized throughout industry to distribute power to one or more associated electronic devices. These PDUs often have a housing, a power input for delivering power to the housing, one or more power outlets mounted in the housing for distribution of power from the input to other electronic units, and a variety of other options for monitoring or control of the PDU, components of the PDU, its associated electronic equipment, and their environment. Thus, PDUs have long been provided in a wide variety of configurations, with differing housings, numbers of outlets, power capabilities, and other features depending on the needs of the customer or the differing applications for PDUs.

Typically, however, each type of PDU in the prior art has been designed to be manufactured in one particular configuration or at least with relatively few options for varying the configuration of the PDU. Thus, each type of PDU in the prior art is typically manufactured with a substantial number of components that are custom designed and manufactured for that type of PDU. Examples of such custom designed and manufactured components include internal PDU wiring, PDU housings and housing apertures, electrical outlets, fuse assemblies, metering displays, power input assemblies, and network communication assemblies.

Once assembled by a manufacturer, many aspects of prior art PDUs typically cannot be readily modified or upgraded in order to accommodate different applications or allow for replacement with existing or improved components.

SUMMARY

Described herein are embodiments of a modular PDU having interchangeable and modular components, or modules. In certain implementations, the modularity of the disclosed PDU allows a manufacturer or other entity, such as an end user in certain applications, to readily alter the configuration of the PDU to support differing needs or applications.

In various embodiments, the PDU may comprise one or more among a plurality of modules such as, but not limited to, outlet modules, communications I/O modules, circuit protection modules, power input modules, and power metering or display modules. In these and other embodiments, one or more available PDU housings or covers can be selected to provide compatibility with one or more of such modules.

In some embodiments, the manufacturer can select, or a third party, such as an end user, can select, one or more desired modules and assemble the selected modules together to provide a customized PDU in a quicker, easier, and/or more economical manner. The manufacturer can also, if desired, more easily and/or rapidly provide a wide variety of PDU configurations, and the manufacturer, user, or other entity can more easily and/or rapidly repair or alter the feature set of a given PDU.

In some embodiments, the PDU can include a housing member, or cover, for receiving and at least partially supporting one or more modules. The PDU housing member can have a substantially closed rear end, closed sides and an open front end. More specifically, in some instances, the PDU housing member includes a rear panel, two side panels and a front opening opposite the rear panel and between the side panels. In specific implementations, the housing member forms a generally elongate "U" shape. The housing member can include a module receiving area, or interior cavity, defined between the rear panel, side panels, and the front opening.

In several embodiments, the modules can include a front panel having PDU housing member engaging portions and module engaging portions, e.g., module connector elements.

In certain implementations, the PDU housing member engaging portions can be coupled to mating features on the PDU housing member to mount the modules to the PDU housing member.

Likewise, in certain implementations, the module engaging portions of one module can be coupled to corresponding modular engaging portions of at least another module to mount, or otherwise physically couple, one module to one or more other modules. For example, in specific implementations, an outlet module can have a front panel with a pair of tabs positioned proximate an end of the front panel with each tab having an aperture. Similarly, a circuit protection module can have a front panel with a corresponding pair of apertures positioned proximate an end of the front panel and each having an aperture. The outlet module and circuit protection module can be mounted to each other by placing the modules end to end, aligning the apertures of respective tabs of one module with the apertures of the other module, inserting a respective fastener through each of the pair of aligned apertures, and tightening the fastener. The physically connected outlet module and the circuit protection module can both be mounted to the PDU housing member at least partially within the module receiving area to form a PDU.

In some embodiments, the PDU can includes one or more apertures positioned along one or more of the panels, such as along a length of the front panel. In certain implementations, the apertures can vary in size, shape, and location on the PDU housing. For example, a PDU can have one or more first apertures that are each sized and shaped to receive an outlet module, one or more second apertures that are each sized and shaped to receive a circuit protection module, and one or more third apertures that are each sized and shaped to receive a monitoring assembly module. The apertures can have one or more mounting elements, such as tabs, pins, screws, etc., configured to engage and secure one or more modules within a respective aperture.

In some embodiments, the modules can include one or more electrical components. In certain implementations, one or more of the electrical components of the modules can be physically or electrically directly coupled to each other, or indirectly couple to each other, such as via the PDU housing or one or more other modules. In certain instances, the electrical components of the modules are electrically coupled to each other via one or more electrical wires. In some implementations, the modules include electrical terminals, such as male terminals, electrically coupled to one or more electrical components associated with the modules. The wires can include terminals, such as push-on female terminals, that are matingly engageable with the module terminals. In some aspects, a female terminal at a first end of a wire is removably engageable with a male terminal of one of the modules and a female terminal at a second end of the wire is removably engageable with a male terminal of another one of the modules.

Accordingly, in some implementations, modules can be electrically coupled to other modules by removably attaching the first end of a wire to a terminal of one module and the second end of the wire to a terminal of the other module. Similarly, two modules can be electrically decoupled by removing at least one of the ends of the wire from one of the terminals of the two modules.

In some embodiments, the modules can include at least one outlet module that is interchangeable with one or more other outlet modules. In specific implementations, for example, an outlet module can include a module housing with a plurality of outlets or receptacles mounted to the housing. The housing can have a front panel from which the receptacles extend and side panels extending at least a length of the front panel. The side panels can include engagement elements, such as apertures or tabs, for engaging a portion of a housing of another module, or a portion of a PDU housing, to removably secure the outlet module to the other module housing or PDU housing, respectively.

The outlets can have any of various receptacle types and include one or more electrical conductivity elements, such as terminals extending away from the front panel in a generally opposite direction than the receptacles.

In some embodiments, each of the outlets and associated wiring or electrical connectivity elements of the outlet modules are coupled to the housing of the modules to form a self-contained unit. Therefore, in at least some implementations, the outlet modules can provide functionality, which in this case can distribute and/or control power to electrical equipment via the outlets, independent of the particular environment in which the outlet modules operate. In other words, like the other modules herein described, in at least some implementations, the outlet modules are not dependent on the particular wiring configuration or housing structure to provide power distribution. For example, the outlet module can operate to distribute power without being mounted within a PDU housing, such as by connecting the components of a power source to respective terminals of one or more of the outlets. Accordingly, in certain implementations, the outlet modules can be mounted to and at least partially within first PDU housing, removed, and mounted to and at least partially within a second PDU housing without requiring adaptation or reconfiguration of the modules for specific use with the first or second PDU and without diminishing the ability of the modules to provide power distribution to electrical equipment.

In some embodiments, the modules can include one or more circuit protection modules.

In certain implementations, the circuit protection module can be a retractable circuit protection module, i.e., a circuit protection module having a movable or retractable fuse carrier, which provides easy access to one or more fuses of the PDU. The retractable circuit protection module can include a base that can be mounted over, or at least partially within, a fuse access passage formed in a front panel of a housing of the module. The retractable circuit protection module can include a fuse holder, or carrier, that removably retains a fuse. When the fuse carrier is in a first position, the fuse is electrically coupled to a printed circuit board mounted to and spaced apart from the front panel. In some implementations, a pair of terminals can be mounted to the printed circuit board to facilitate electrical coupling between the fuse and the printed circuit board. The fuse carrier can be moved into a second position where the fuse is electrically disconnected from the terminals and the printed circuit board.

In certain implementations, the retractable circuit protection module, including the front panel, base, fuse carrier, printed circuit board and terminals form a self contained unit capable of being attached to other modules, such as other retractable circuit protection modules, or mounted to a panel of a PDU housing, such as by being secured at least partially within an aperture formed in the panel of the PDU housing.

In certain implementations, the circuit protection module can be a removable or replaceable circuit protection module, i.e., a circuit protection module having a removable or replaceable fuse holder, for providing quick and easy removal of a fuse in the event the fuse is blown or in a non-operational state. The replaceable circuit protection module can include one or more fuse holders each housing one or more fuses. The fuse carriers are configured to be electrically coupleable to and easily removable from terminals or plugs mounted to a printed circuit board. The printed circuit board can be mountable to and spaced apart from a front panel of the replaceable circuit protection module. The front panel can have one or more apertures through which the one or more fuse holders extend when plugged into the terminals or plugs.

In certain implementations, the replaceable circuit protection module, including the front panel, holder, plugs and printed circuit board, form a self-contained unit capable of being attached to other modules, such as retractable or other replaceable circuit protection modules, or mounted to a panel of a PDU housing, such as by being secured at least partially within an aperture formed in the panel of the PDU housing.

In some embodiments, the PDU can include other modules, such as communications I/O modules, power input modules, display or power metering assembly modules. Moreover, the modules can be mountable to other modules or to a PDU housing in the same or a similar manner as described above in relation to the outlet modules and circuit protection modules.

In some embodiments, a customized PDU configuration comprised of one or more interchangeable modules can be initially selected by a manufacturer or end user and subsequently assembled by the manufacturer or end user. For example, the manufacturer or end user, hereinafter defined "user," can initially select one or more of the following components: (1) a desired I/O controller selected from a group of such controllers; (2) a desired PDU input voltage and current components selected from any of various combinations of voltage and current components; (3) a desired circuit protection type; (4) the desired number of power outlets; and (5) the desired type of power outlets.

Based on the desired characteristics or components, in some implementations, the user can then select one or more of the following modules corresponding to the desired characteristics or components: (1) one or more communications I/O modules; (2) one or more current display or metering modules; (3) one or more power input modules; (4) one or more circuit protection, e.g., fuse and circuit breaker modules; and (5) one or more outlet or outlet modules.

Once one or more modules are selected, in some implementations, a corresponding wire harness, PDU housing or cover, and circuit protection-type can be selected. In some implementations, a Bill of Materials can be generated based on the user's selections.

Generally, the PDU can be assembled by interconnecting the various selected components and modules. For example, the various modules can be first physically coupled to each other to form a component portion of the PDU and mounted at least partially within a PDU housing member, or cover, to form a PDU. Alternatively, in some implementations, various modules can be individually mounted at least partially within respective apertures formed in a panel of a PDU housing to form the PDU.

In some embodiments, the modules can be electrically connected to each other and other modules or electronic components via the selected wire harness to provide interconnectivity between one or more of the modules and one or more external devices, such as electronic equipment, servers, computers, other PDUs and the like. For example, in some implementations, one or more wires of the selected wire harness can be electrically coupled to a selected outlet module and electrically coupled to a circuit protection module that is removably coupled to the outlet module such that the wire harness provides electrical interconnectivity between the outlet module and the circuit protection module. In certain implementations, a selected input power module can be electrically coupled to a power source and the wire harness such that power can be transmitted from the power source through the input power module to the circuit protection module and associated outlet module via on or more wires of the wire harness.

In the event one of the modules of an assembled PDU becomes inoperative, outdated, undesirable, or otherwise warrants repair or replacement, in some implementations, the module can be easily removed and replaced without complicated disassembly or reconfiguration of the PDU, a complete replacement of the PDU with a separate PDU having the desired configuration, or causing any damage to the PDU. For example, the component portion of the PDU can be removed from the PDU housing member or cover by loosening one or more fasteners. In specific implementations, the module to be removed or replaced can be electrically disconnected from other modules or components by disconnecting the wire terminals from the module terminals, e.g., pulling the female terminals of the wires out of engagement with the male terminals of the module. The module can then be physically removed from adjacent modules, for example, by loosing one or more fasteners.

If the removed module is broken, in certain implementations, it can be repaired and reconnected in the same manner as originally configured. Alternatively, if desired, the repaired module can be reconnected to one or more different modules in a different location along the component portion of the PDU.

If a replacement for the removed module is desired, in some implementations, the removed module can be replaced by a new module or, if the module required repair, in some implementations, the removed module can be repaired and remounted within the housing. For example, a user may desire a PDU with a first configuration of modules for use in a first application, but later desire a PDU with a second configuration of modules for use in a second application. According to the principles and features of the present disclosure, in some embodiments, the user need not purchase an entirely new PDU having the second configuration of modules, but can easily reconfigure the present PDU by interchanging or replacing modules as desired to provide a PDU having the second configuration.

In one specific implementation, for example, an assembled PDU can have a first outlet module having a plurality of interconnected IEC-type outlets and being electrically coupled to the wire harness. If NEMA-type outlets are desired, the first outlet module can be removed from the PDU housing aperture within which it is mounted and a second outlet module having a plurality of interconnected NEMA type outlets can be mounted within the aperture in place of the first outlet module and be electrically coupled to the wire harness in the same or a similar manner as the first outlet module. Accordingly, in this manner, a single PDU facilitating power distribution to electrical equipment having IEC-type plugs can be reconfigured to facilitate power distribution to electrical equipment having NEMA-type plugs without replacing the entire PDU It is to be understood that the foregoing is a brief description of various aspects of various embodiments. It is therefore also to be understood that the scope of the invention is to be determined by the claims as issued and not by whether given subject matter includes any or all such features or advantages or addresses any or all of the issues noted in the Background above.

In addition, there are other advantages and varying novel features and aspects of differing embodiments. The foregoing and other features and advantages will become more apparent from the following detailed description, which proceeds with reference to the accompanying figures.

BRIEF DESCRIPTION OF THE DRAWINGS

FIGS. 14A-14D are schematic diagrams of the respective blocks shown in FIG. 14.

DETAILED DESCRIPTION

Described herein are embodiments of a power distribution unit (PDU) having modular features. The modular features, e.g., modules, can be selected, easily coupled to each other, and easily replaceable or removable from each other to provide a customizable and reconfigurable PDU. As used herein, for a first module to be coupled, either physically or electrically, to a second module, the first module need not be directly coupled to the second module, but can be indirectly coupled to the second module, such as when an intermediate component or components are positioned between the first and second modules. Further, as defined herein, a module or modular feature is any self-contained and independently operable component that is removably securable to one or more other components. In certain implementations, the modules can be tested at a modular level independent of or separated from other modules. Accordingly, the PDU described herein is not limited to any particular module examples described below, but can include any of various modules or modular features not specifically described.

Figure 1:
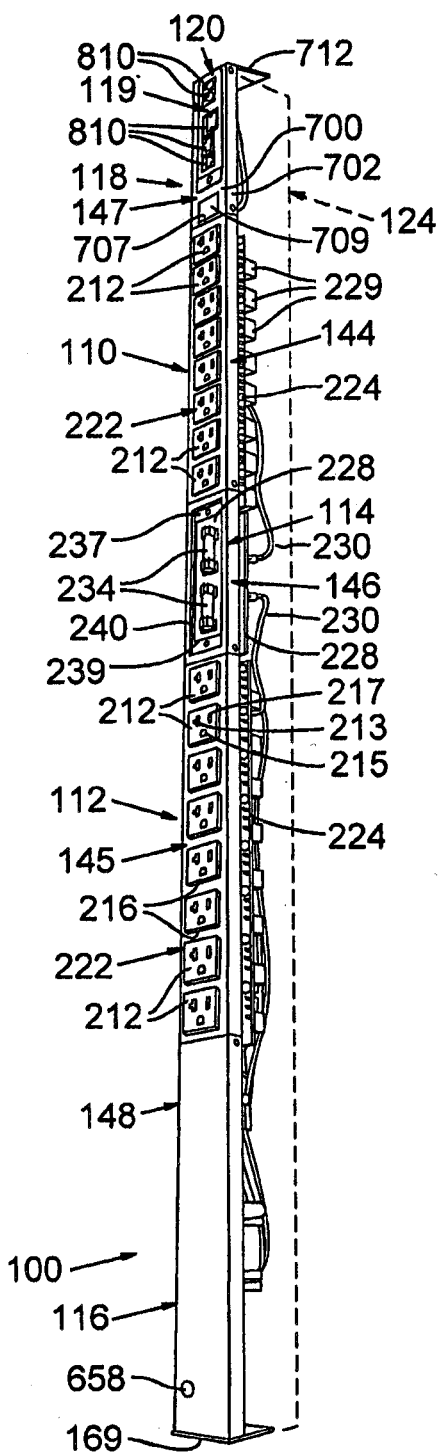
FIG. 1 is a perspective view of one embodiment of a power distribution unit having a plurality of interconnected modules.

Referring to FIG. 1, in some embodiments, a PDU, such as PDU 100, can include modules, such as first and second outlet modules 110, 112, circuit protection module 114, power input module 116, and display module 118 having a removable communications I/O module 119, detachably connected to each other to form a PDU component portion 120. The PDU component portion 120 is removably mounted at least partially within a PDU cover 124 to form the PDU 100. As used herein, a PDU is any device adapted to receive one or more polyphase, or single-phase, power inputs and has a plurality of outputs, such as single-phase power outputs.

Each module of the PDU 100 includes a front panel having a leading end and a trailing end generally opposite the leading end. More specifically, first outlet module 110 includes a front panel 144 having a leading end 150 and a trailing end 152, second outlet module 112 includes a front panel 145 having a leading end 154 and a trailing end 156, circuit protection module 114 includes a front panel 146 having a leading end 158 and a trailing end 160, display module 118 includes a front panel 147 having a leading end 162 and a trailing end 164, and power input module 116 includes a front panel 148 leading end 169 and a trailing end 168.

The front panels, or front sections, of each of the illustrated modules are at least partially elongated in a longitudinal, or leading end to trailing end, direction and have any of various lengths. The front panels of the illustrated modules have the same or similar widths, which is approximately equal to a width of the PDU cover 124.

As will be described in more detail below, each module includes two side walls extending transversely from the front wall. The side walls include one or more PDU cover mounting elements, such as, for example, spaced-apart apertures, such as apertures 137 of outlet module 112 (see FIG. 4). When the modules are interconnected, the PDU cover mounting elements extend along the length of the PDU component portion.

The PDU cover 124 includes an elongate generally "U" shaped member having a back wall 125 and two side walls 126, 128 extending the length of the back wall and transversely from the back wall. The back wall and two side walls 126, 128 define an interior cavity 131 (see FIG. 12) for receiving the PDU component portion 120. The two side walls 126, 128 can include spaced-apart apertures 121 displaced along the length of the PDU cover 124. The PDU component portion 120 is received and positioned in the interior cavity 130 of the PDU cover 124 such that the apertures formed in the side walls of the modules align with the apertures, such as apertures 121, formed in the sides walls 126, 128 of the PDU cover. A fastener, such as screws (not shown) can be inserted into respective aligned apertures to secure the PDU component portion 120 to the PDU cover 124.

The PDU cover 124 is configured to accommodate a PDU component portion 120 having two outlet modules 110, 112 each including eight outlets 212, such as eight 110-125 VAC outlets or eight 208-240 VAC outlets. In other embodiments, the PDU cover 124 can be configured to accommodate a PDU component portion having three outlet modules each including eight outlets. In yet other embodiments, the PDU cover can have any of various lengths, aperture placements, lengths, and widths to accommodate PDU component portions having any number of modules each having any of various module configurations.

Figure 2:
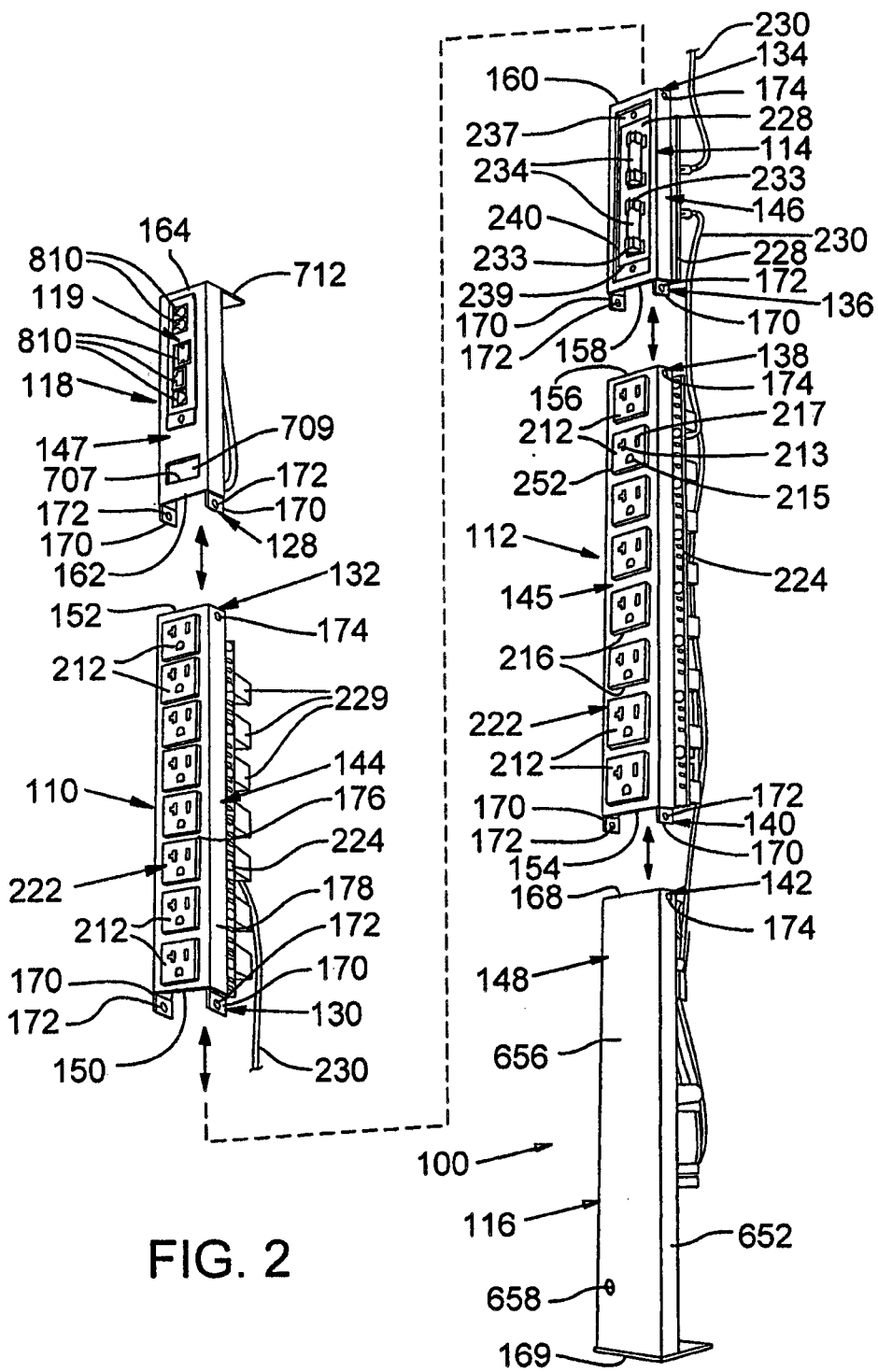
FIG. 2 is a perspective view of the power distribution unit of FIG. 1 shown with the modules disconnected from each other.

Referring to FIG. 2, the first outlet module 110, second outlet module 112, circuit protection module 114, power input module 116, and display and communications I/O module 118 each include at least one module connector element configured to engage, align with, mate with, or otherwise couple to, the at least one module connector element of an adjacent module.

For example, the first outlet module 110 includes a module connector element 130 proximate its leading end 158 that is matingly engaged with a module connector element 134 of the circuit protection module 114 proximate its trailing end 160 to detachably connect the first outlet module to the circuit protection module. Similarly, the first outlet module 110 includes a module connector element 132 proximate its trailing end 152 that is matingly engaged with a module connector element 128 of the display and communications I/O module 118 proximate its leading end 162 to detachably connect the first outlet module to the display module. In a similar manner, the circuit protection module 114 is detachably connected to the second outlet module 112 via mating engagement between a module connector element 136 of the circuit protection module proximate its leading end 158 and a module connector element 138 of the second outlet module proximate its trailing end 156. The second outlet module 112 is detachably connected to the power input module 116 via mating engagement between a module connector element 140 of the second outlet module proximate its leading end 154 and a connector element 142 of the power input module 116 proximate its trailing end 168.

In the particular embodiment shown in FIGS. 1 and 2, leading ends of respective modules are directly connected to trailing ends of adjacent modules. Such interconnection can be facilitated by positioning a connector element of a first type proximate the leading ends of the modules and a connector element of a second type that is mateable with the first type proximate the trailing ends. For example, as described generally with reference to FIG. 2 and more specifically below, the connector element of the first type can be a pair of spaced apart tabs 170 extending from the leading end and each having an aperture 172 (see, e.g., display module 118) and the connector element of the second type can be a pair of apertures 174 formed in the front panel and alignable with the apertures 172 (see, e.g., first outlet module 110).

Although the illustrated embodiments show PDU modules interconnected in an end-to-end configuration, e.g., leading end to trailing end configuration, in other embodiments, the PDU modules can be interconnected in a side-by-side configuration in the same or similar manner. For example, the modules can include connector elements of a first type on a first side of the module and connector elements of a second type that is mateable with the first type on a second side opposite the first side. Modules could then be mountable in a side-by side configuration by matingly engaging connector elements of the first type on a one module with the connector elements of the second type on an adjacent module and vice versa. In yet other embodiments, modules can have connector elements on ends and sides such that a PDU can have modules interconnected in end-to-end configurations and side-by-side configurations.

As will be described in more detail below, the configuration of PDU 100, including the specific type, number, and order of modules, is merely one of any number of possible PDU configurations. For example, although PDU 100 in the embodiment illustrated in FIG. 1 includes one circuit protection module intermediate two outlet modules, in other embodiments, a PDU can include two circuit protection modules connected to each other intermediate the two outlet modules. Or, alternatively, in other embodiments, the two outlet modules can be connected directly to each other and the two outlet modules can be connected to and intermediate two circuit protection modules.

Similarly, as will be described in more detail below, a user in possession of the PDU 100 having the particular configuration illustrated in FIG. 1, can reconfigure the PDU into a PDU having any number of various desired configurations. For example, the user can easily detach the circuit protection module 114 from the adjacent outlet modules 110, 112 and replace it with a different circuit protection module, or, in the event the circuit protection module 114 is disabled (but repairable), repair and reconnect it to the adjacent outlet modules.

The detailed description now proceeds with reference to particular embodiments of various types of modules that can be assembled individually within a PDU cover to form a PDU or interconnected with each other and mounted within a PDU cover to form a PDU.

Outlet Modules

Figure 4:
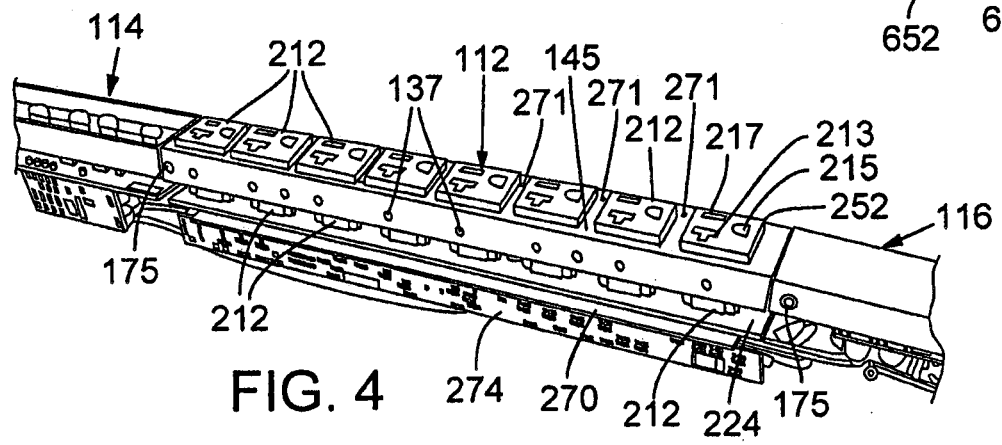
FIG. 4 is a perspective view of an outlet module of the power distribution unit of FIG. 1.

In some embodiments, the PDU can have one or more outlet modules, such as outlet modules 110, 112 shown in FIGS. 1, 2, and 4. As used herein, an outlet module can include one or more outlets, such as a plurality of outlets, or receptacles, each configured to distribute power to electronic equipment. In some implementations, the outlet module can be configured such that power distribution through each outlet is individually, or collectively, controlled. In implementations having a plurality of outlets, the outlets can be electrically interconnected to each other via a conductive element, such as a wire or printed circuit board.

Figure 5:
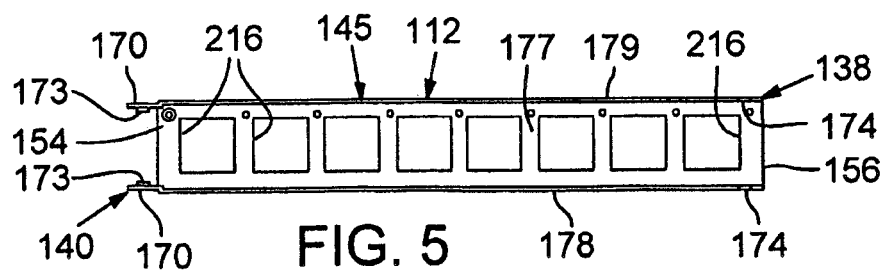
FIG. 5 is a rear plan view of a front panel of the outlet module of FIG. 4.

The outlet modules 110, 112 of power distribution unit 100 each includes a set of outlets 222 comprising a plurality of interconnected outlets 212 extending through apertures 216 (see FIG. 5). Outlet modules 110, 112 include respective front panels, or sections, 144, 145 that include respective front walls 176, 177 and two side walls 178, 179 extending the length of and transversely to the front wall. Outlet apertures, such as apertures 216 (see FIG. 5), are formed in the front walls 176, 177 and displaced along a length of the front panels 144, 145 in a spaced-apart manner. In the specific implementation shown; the apertures 216 are each sized and shaped to receive a NEMA 5-20R type outlet.

Each outlet 212 of the set of outlets 222 can have a generally planar outlet receptacle end portion 252 (see FIG. 2) mounted to the respective front panels 144, 145 of the outlet modules 110, 112. The outlet receptacle end portion 252 includes three power component sockets 213, 215, 217 formed therein and sized to receive a respective power component prong of an electronic device power plug. For example, sockets 213, 215, 217 can be neutral, ground and hot power component sockets, respectively, sized to receive a neutral, ground and hot prong, respectively, of an electronic device plug. In some embodiments, each outlet can include two or fewer, or four or more sockets, and the sockets have any of various shapes and sizes depending on the particular power distribution requirements for the various electrical devices to be in power receiving communication with the outlets.

The sockets 213, 215, 217 include conductive elements (not shown) for transmitting the neutral, ground, and hot components, respectively, of electrical power to electrical devices.

Although the outlets 212 are shown as being NEMA 5-20R outlets and the apertures are configured to receive such outlets, any outlet type and aperture shape and size can be used. For example, in some implementations, an outlet module can include other NEMA type outlets (e.g., NEMA 5-15R, NEMA 6-20R, NEMA 6-30R or NEMA 6-50R) or any of various IEC types (e.g., IEC C13 or IEC C19) and the apertures can be sized and shaped to receive such outlets. In these implementations, the front panel can have the same or a different length and width, and the same module connectors, as the respective front panels 144, 145 of outlet modules 110, 112. Accordingly, as with other component modules described herein, outlet modules of these alternative implementations are interchangeable with or can be interconnected to outlet modules 110, 112 or other similar outlet module. It also will be understood that in some embodiments, all the interconnected outlets need not be identical.

Figure 3:
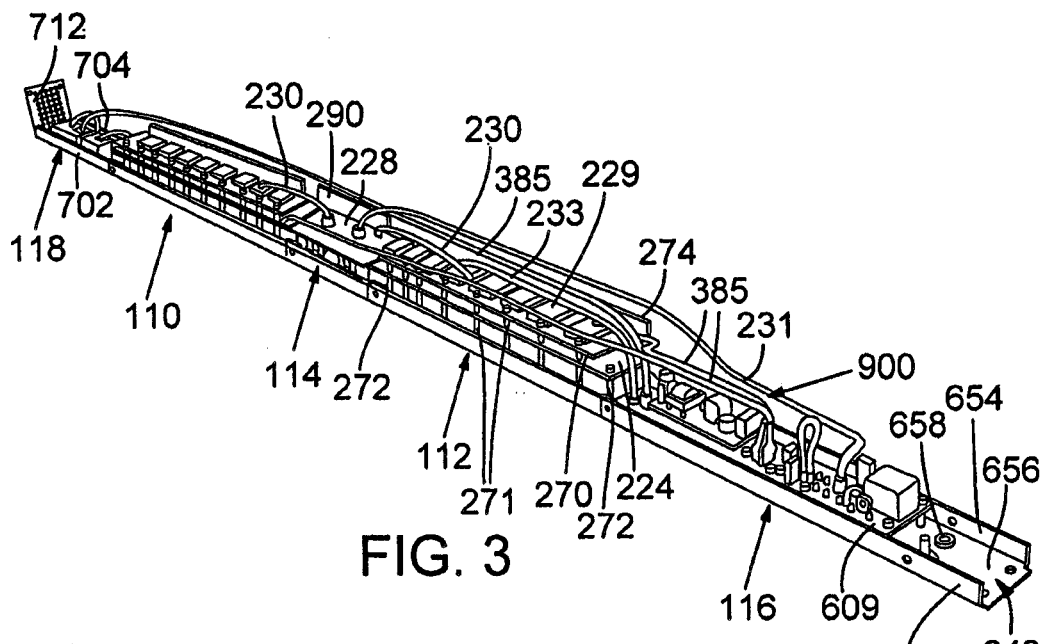
FIG. 3 is a perspective rear view of the power distribution unit of FIG. 1.

Referring to FIGS. 3 and 4, the conductive elements of each of the outlets 212 are electrically coupled to respective connection points on a first, or lower, circuit board 224 disposed generally parallel to the module front section 144.

In some specific implementations, the outlet modules, e.g., outlet modules 110, 112, include a second, or upper, circuit board 270 mounted to the first circuit board 224 by conductive spacers 272. Further, in certain implementations, the outlet modules includes non-conductive light transmitting columns 271 corresponding to each outlet 212 to provide a visual indication as to whether power is being transmitted to the outlets. A relay control board 274 is mounted to the second circuit board, or relay support board, 270 and extends generally transversely relative to the second circuit board. The first circuit board 224 is positioned intermediate the outlets and the second circuit board 270. A plurality of relays, such as relays 229, is mounted to the second circuit board 270. Each relay 229 corresponds to one of the plurality of outlets 212 and is configured to monitor and/or control power to respective power outlets 212.

In certain implementations, each outlet 212 is directly mounted to the circuit board 224 and a respective relay independent of the other outlets such that each outlet can be individually controlled. Moreover, independently mounting the outlets directly to the circuit board reduces costs and simplifies manufacturing.

One or more of the circuit boards 224, 270, 274 are electrically connected to a fuse board 228 of the circuit protection module 114 by one or more wires. For example, in one implementation, the circuit boards 224 of outlet modules 110, 112 are electrically connected to the fuse board 228 by an AC power wires 230 (see FIGS. 1 and 2). Accordingly, in the illustrated implementation, AC power is transmitted from a power source to the circuit protection module 114 via AC power wires 231 (see FIG. 3), and from the circuit protection module to the outlet modules 110, 114 via wires 230. In general, the printed circuit board 224 can have one or more power lines and/or power control lines in power receiving communication with a respective power component of the power source. Each power control line can be electrically coupled to one or more of the electrical relays 229, intelligent power modules, or other power regulating or controlling devices.

In some implementations, one or more microprocessors (not shown), such as an IPM core logic and execution unit, can be electrically coupled to, such as by being mounted to, the circuit board 224 and powered by a low voltage DC power supply being transmitted to the board via a bus, such as an I2C bus. The microprocessors can be in electrical communication with one or more of the relays 229 and a master communications module (not shown) via a bus, such as an I2C bus. The master communications module can control the microprocessors, which in turn control the regulatory function of the one or more relays 229.

In some implementations, each outlet module can include more than one set of outlets each having two or more receptacles, e.g., four or eight receptacles. For example, for sets of outlets having eight receptacles, for every set, power to each of the eight outlets is regulated by a respective one of eight relays, with each of the eight relays being in electrical communication with a single microprocessor. In other words, a single microprocessor mounted to a board, such as printed circuit board 224, controls the eight relays associated with the eight outlets of a given set of interconnected outlets. In these implementations, a separate AC power supply wire or cable is provided for each set of interconnected outlets. In other words, at least one AC power supply cable is electrically connected to a printed circuit board, such as printed circuit board 224, every four outlets, or relays, to provide power to the outlets of a respective set of outlets.

Referring to FIGS. 2 and 5, connector elements 130, 140 of outlet modules 110, 112, respectively, include a pair of tabs 170 inwardly offset from and extending generally parallel to a respective side wall 178. The tabs 170 each include an aperture 172 formed in the tabs. The apertures 172 are positioned a distance away from the leading ends 150, 154 of the front panels 144 of the outlet modules 110, 112. The apertures 172 can be threaded, or in some embodiments, a threaded insert, such as insert 173, having a threaded aperture can be secured to the inwardly facing surfaces of the tabs 170 in coaxial alignment with the apertures 172 (see FIG. 5).

In specific implementations, the tabs 170 are inwardly offset a distance approximately equal to the thickness of the side walls 178. In other words, a lateral distance between the outwardly facing edges of the tabs 170 are less than a lateral distance between the inwardly facing surfaces of the side walls 178. Accordingly, as will be described in more detail below, the tabs 170 are configured to be received between the side walls 178 of the trailing edge of an adjacent module.

The outlet modules 110, 112 also include the module connector elements 132, 138 proximate the trailing ends 152, 156 of the respective front panels 144. The connector elements 132 each include a pair of apertures 174 each formed in a respective side wall 178 at a predetermined distance away from the respective trailing ends 152, 156. The predetermined distance is equal to the distance of the respective apertures 172 away from the leading ends 150, 154. Accordingly, with the tabs 170 being inwardly offset, the side walls 178 of the trailing end of an adjacent module can be positioned around the tabs such that the apertures 172, 174 are aligned. Fasteners, such as screw 175, can be inserted through the apertures 174 and corresponding apertures in the tabs of an adjacent module, or through an aperture formed in the side walls of an adjacent module and corresponding apertures 172 in the tabs 170 of connector elements 130, 140 to tighten the side walls of one module against the tabs of an adjacent module. In this manner, the outlet modules 110, 112 can be coupled to adjacent modules to form the PDU component portion 120.

The specific embodiments of outlet modules described above are merely examples. In other embodiments, outlet modules having any of various configurations, e.g., modules having more or less than eight outlets, and having one or more module connector elements can be used.

Circuit Protection Modules

The power distribution unit described herein can include any of various circuit protection modules, i.e., a component having a circuit protection element that is removably securable to one or more other components to provide a fused device. Described below are several embodiments of circuit protection modules. Such embodiments are merely exemplary and embodiments of circuit protection modules different than or similar to the circuit protection modules embodiments described below can be used.

1. First Embodiment

Figure 6:
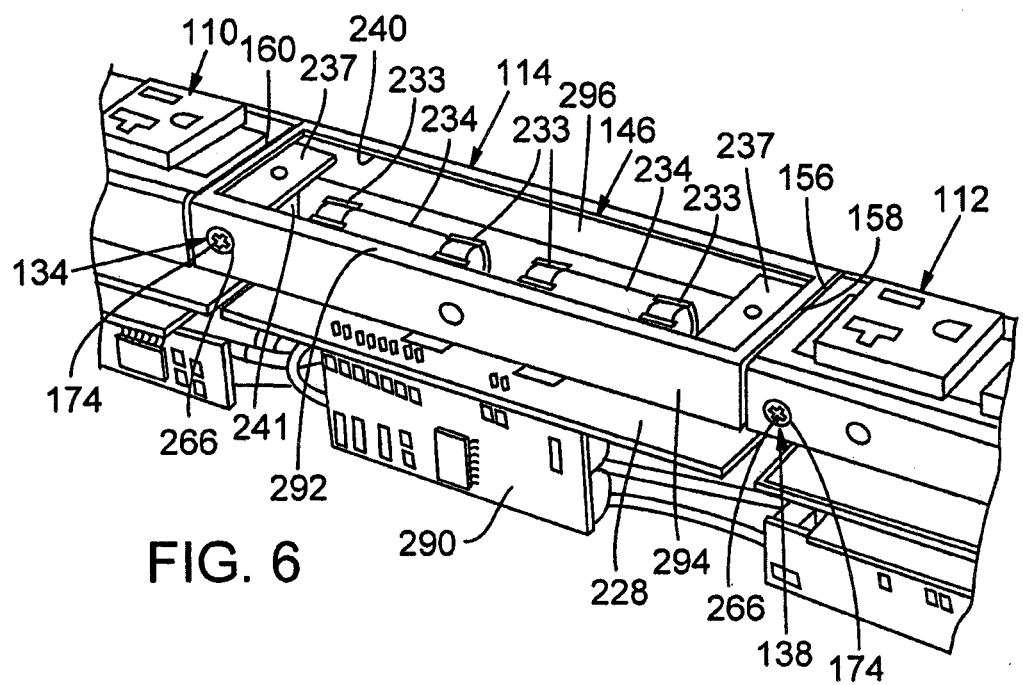
FIG. 6 is a perspective view of a first embodiment of a circuit protection module for use with the power distribution unit of FIG. 1.

In some embodiments, the PDU can have one or more circuit protection modules, such as circuit protection module 114 shown in FIGS. 1, 2 and 6. Circuit protection module 114 includes two fuses 234 each connected to the fuse board 228 via terminals 233. Each fuse 234 is electrically connected to and provides overcurrent protection for at least one of the outlets of outlet modules 110, 112, respectively.

Referring to FIG. 6, the circuit protection module 114 includes a front panel 146 that has a front wall 292 and two side walls 294, 296 extending the length of the front wall and transversely from the front wall. The fuses 234 and fuse board 228 are mounted at least partially within an aperture 240 penetrating a circuit protection module front panel, or section, 146 at a location intermediate the leading and trailing ends 158, 160, respectively. Accordingly, the fuse board 228 and associated fuses 234 are accessible through the aperture 240. The aperture 240 includes mounting tabs 237 to which a clear or at least partially transparent window (not shown) can be mounted to allow a user to view the fuses 234 yet provide protection from contact with external objects. The window can be fastened to the mounting tabs 273 within the aperture 240 using conventional fastening means, such as screws.

Referring to FIG. 6, the fuse board 228 is mounted to an inwardly directed surface of a front panel, or section, 146 via spacers, such as spacer 241. The spacers support the fuse board 228 in a spaced-apart relationship with the front panel 146. A second circuit board 290 can be mounted and electrically coupled to the fuse board 228. The circuit board 290 can include circuitry and terminals for providing data communication links with other components of the PDU.

Referring back to FIG. 2, the module connector element 136 proximate the leading end 158 of the front panel 146 includes a pair of tabs 170 inwardly offset from and extending generally parallel to a respective side wall 294, 296 (see FIG. 6) of the front panel 146. The tabs 170 each include an aperture 172 formed in the tabs. The module connector element 134 proximate the trailing end 160 includes a pair of apertures 174 each formed in a respective side wall 294, 296 a predetermined distance away from the trailing end 160 of the front panel 146.

The tabs 170 of connector element 136 are configured to matingly engage a connector element of a trailing end of an adjacent module, such as outlet module 112. The tabs 170 are placed between the side walls of the adjacent module and the apertures 172, 174 are aligned. A fastener, such as screw 266, can be inserted through the aligned apertures 172, 174 and tightened to secure the leading end 158 of the circuit protection module 114 with the trailing end 156 of outlet module 112. Similarly, the tabs of an adjacent module, such as tabs 170 of outlet module 110, can be positioned between the side walls 294, 296 of the circuit protection module 114 such that the apertures 172, 174 are aligned. A fastener, such as screw 266, can be inserted through the aligned apertures 172, 174 and tightened to secure the trailing end 160 of the circuit protection module 114 with the leading end 150 of outlet module 110.

In specific implementations, the circuit board 228 can be electrically connected to a power source input and the outlets of one or more outlet modules to complete a circuit between the power source input, one or more fuses 234, and the outlets. The fuses 234 are configured to interrupt the circuit, such as by melting a fusible metal wire within the fuse, once the current flowing through the circuit exceeds a predetermined amperage. The PDU 100 can include a fuse condition indicator to indicate whether the fuse has been blown, i.e., the metal wire has melted. If the fuse is blown, it must be replaced in order for the circuit to be closed and power to be restored to the associated outlets. A user can dismount the window by unscrewing the screws that hold the window to the tabs 237 in the fuse aperture 240. The blown fuse can then be manually grasped and removed from the circuit protection module 114. In alternative embodiments, as will be described below, the circuit protection module 114 can be replaced by another circuit protection module and removal of a blown fuse can be accomplished by alternative means.

2. Second Embodiment

Figure 7:
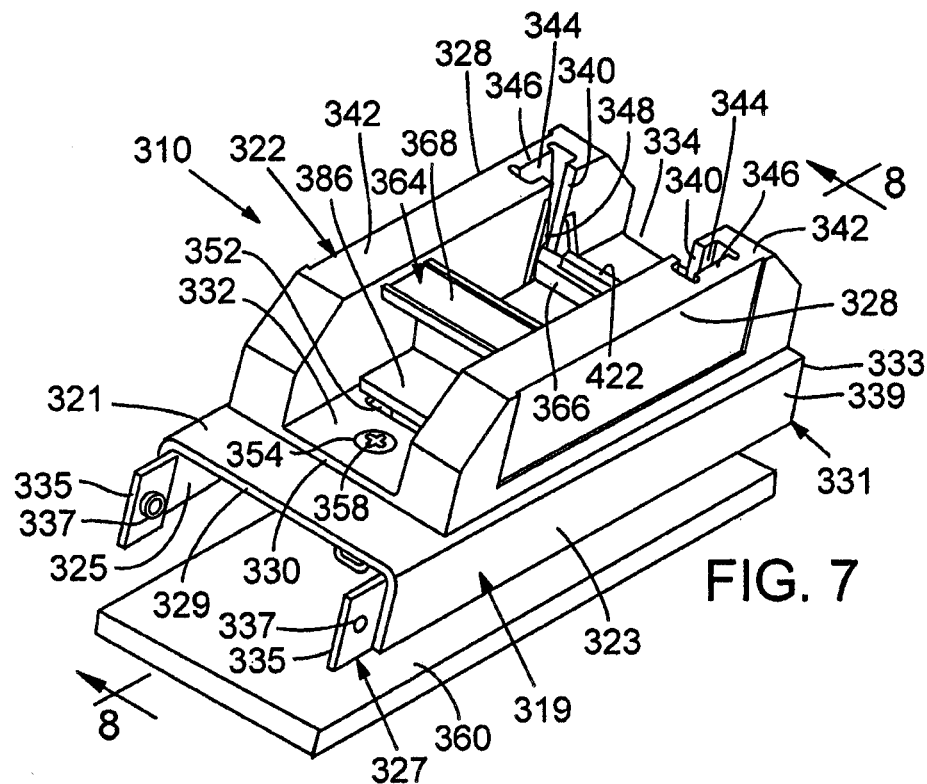
FIG. 7 is a perspective view of a second embodiment of a circuit protection module for use with the power distribution unit of FIG. 1.
Figure 8:
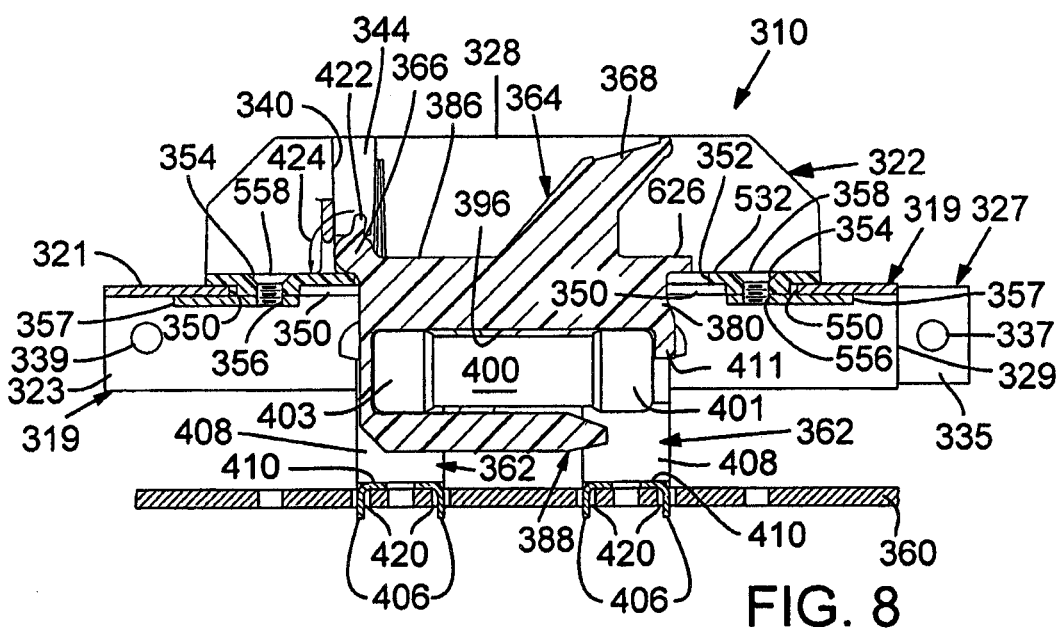
FIG. 8 is a cross-sectional view of the circuit protection module of FIG. 7 taken along the line 8-8 of FIG. 7.

For example, referring to FIGS. 7 and 8, circuit protection module 114 can be replaced by or coupled to a different circuit protection module, such as circuit protection module 310. Fuse module 310 includes, for example, a base, or mount, 322 mounted to the external surface of a front panel 319. The front panel 319 includes a front wall 321 and two side walls 323, 325 extending the length of and transversely from the front wall.

The circuit protection module 310 includes a module connector element 327 proximate a leading edge 329 of the front panel 319 and a module connector element 331 proximate a trailing edge 333 of the front panel. The module connector element 327 includes a pair of tabs 335 with respective apertures 337 and the module connector element 331 includes apertures 339 formed in respective side walls 323, 325 of the front panel 319. The module connector element 327 and the modular connector element 331 are matingly engageable with corresponding trailing and leading end connector elements of any of various modules, such as those described above.

In the illustrated embodiments, the base 322 includes two opposing sidewalls 328 that extend longitudinally in relation to the front panel 319 and transverse to the front wall 321 of the front panel 319 when the base is mounted to the front panel as shown in FIG. 7. The base 322 further includes a mounting wall 330 intermediate and coupling the sidewalls. The mounting wall 330 includes an inwardly directed surface (not shown) that is parallel to and coextensive with the external surface of the front wall 321 when mounted to the front panel 319 and an outwardly directed surface, or carrier support surface, 332 opposite the inwardly directed surface. A fuse carrier receiving area 334 is defined between the mounting wall 330 and opposing sidewalls 328.

The base 322 also includes a pair of opposing slot portions 340 with one slot portion 340 formed in one base sidewall 328 and the other formed in the other base sidewall 328. The slot portions 340 face each other and extend generally transverse to the front wall 321 from an outer surface 342 of the sidewalls 328 away from the front panel 319 to the outwardly facing carrier support surface 332 of the base. The slot portions 340 include opposing resiliently flexible tabs 344 where each tab extends toward the opposing tab at a slight angle from fixed ends 346 at the outer surface 342 of the sidewalls 328 toward free ends 348 near the outwardly facing carrier support surface 332.

The length of the tabs 344 is such that the free ends 348 of the tabs are located intermediate the outer surface 342 of the base 322 and the carrier support surface 332 of the base. In other words, the tabs 344 extend a distance away from the outer surface 342 such that a space is defined between the free ends 348 of the tabs and the carrier support surface 332.

The front panel 319 includes at least one fuse passageway 350 through which an interior of the housing can be accessed (see FIG. 8). More specifically, the base 322 is mounted to the front panel 319 substantially over the corresponding fuse passageway 350 such that the interior of the front panel 319 can be accessed through the fuse passageway 350 and a base fuse passageway 352 penetrating the base 322.

In some implementations, mounting apertures 354 penetrate the base 322. The apertures 354 correspond to and align with apertures 356 (see FIG. 8) formed in tabs 357 fixed to the front panel 319. A fastener, such as a screw 358, can be inserted through the mounting apertures 354 and tab apertures 356 and tightened to secure the base 322 to the front panel 319.

The circuit protection module 310 includes a printed circuit board 360 mounted to and disposed within the front panel 319. The printed circuit board is associated with at least one outlet module. When interconnected with other modules to form a PDU component portion, the printed circuit board 360 is electrically coupled to a power input via one or more power input connections (not shown) disposed on the printed circuit board and to one or more connected outlet modules via respective power output connections (not shown) disposed on the printed circuit board. The power input and output connections are electrically coupleable via circuitry formed on or in the printed circuit board 360.

Referring to FIG. 8, the circuit protection module 310 includes a pair of fuse terminals, or clips, 362 mounted to the printed circuit board 360, such as by soldering or through use of mounting structures available or known in the art.

The circuit protection module 310 includes a movable fuse carrier 364 with a generally cylindrical portion 366 and a user engaging portion 368. The pair of slot portions 340 receives end portions of the cylindrical portion 366. In specific implementations, each end portion of the cylindrical portion 366 at least partially extends into a respective opposing slot portion 340 and is retained within the slot portion by the resiliently flexible tabs 344 formed in each slot portion. The space defined between the free ends 348 of the tabs 344 and the carrier support surface 332 is larger than a maximum diameter of the end portions of the cylindrical portion 366. Further, the sidewalls 328 and slot portions 340 are spaced apart from each other such that the distance between the fixed ends 346 of the opposing tabs 344 is slightly greater than the length of the cylindrical portion 366 and the distance from the free ends 348 of opposing tabs is shorter than the length of the carrier cylindrical portion 366 when the tabs are in an un-flexed state.

The fuse carrier 364 is retractable, repositionable, or otherwise movable, relative to the base 322 and the front panel 319 to which the base is mounted. For example, as shown, the fuse carrier 364 is movably, e.g., pivotally, attached to the base 322. The fuse carrier 364 can be movably attached to the base 322 by inserting the end portions of the cylindrical portion 366 into the opposing slot portions 340 proximate the outer surface 342 of the base. The fuse carrier 364 can then be moved inwardly toward the carrier support surface 332 of the base 322, such as by sliding the end portions of the cylindrical portion 366 within the slot portions 340. As the fuse carrier 364 is moved, the end portions of the fuse carrier contact and urge respective opposing tabs 344 to flex or move away from each other. The tabs 344 continue to flex until the end portions of the cylindrical portion 366 move beyond the free ends 348 of the tabs 344, at which time the resiliently flexible tabs return to an un-flexed state to capture the end portions of the cylindrical portion 366 within the space defined between the free ends 348 of the tabs and the carrier support surface 332 of the base 322. The space is sized such that the end portions of the cylindrical portion 366 are allowed to rotate within the space. In this manner, the fuse carrier 364 can be movably retained within the fuse carrier receiving area 334 of the base 322.

In other embodiments, the fuse carrier can be attached to the base by other known connecting mechanisms that allow movement of the carrier relative to the base, such as by a pin extending through an axial passageway in the cylindrical portion of the carrier and engaging corresponding holes in the base, a hinged connection, or other mechanism or mechanisms commonly known in the art.

According to the illustrated embodiment, fuse carrier 364 includes a body 380 having an outwardly facing surface 386. The user engaging portion 368 extends from the outwardly facing surface 386 of the body 380. The fuse carrier 364 also includes a fuse support arm 388 that extends from the body at a location away from the user engaging portion 368. A fuse receiving area 396 is defined between the body 380 and the fuse support arm 388.

As shown in FIG. 8, the fuse receiving area 396 is sized to receive and retain a fuse 400, similar to fuses 234 described above. The fuse 400 includes first and second conductive ends 401, 403. In the illustrated embodiment, the support arm 388 has a length of at least half the length of the fuse 400. To provide lateral support of the fuse, i.e., to resist lateral movement of the fuse, the fuse carrier 364 can include lateral support arms (not shown) extending from the carrier body 380 to the support arm 388. Further, longitudinal movement of the fuse 400 away from fuse receiving area 396 can be resisted by a stop 411 extending transversely from the inwardly facing surface of the carrier body.

The support arm 388 can be resiliently movable relative to the body 380 to removably secure fuse 400 within the fuse receiving area 396 in, for example, a snap-fit type arrangement. For example, the fuse 400 can be inserted into the fuse receiving area 396 such that the fuse contacts and causes the support arm 388 to move. As the fuse 400 is fully inserted into the fuse receiving area 396, the support arm 388 resiliently moves back into an unbiased state and the stop 411 and lateral support arms retain the fuse in the fuse receiving area. A user can remove the fuse 400 from the fuse receiving area 396 by grasping the fuse and pulling the fuse in a partially downwardly direction to overcome the biasing force of the support arm 388 and move the arm downwardly away from the body. The fuse 400 can then be slid out of the fuse receiving area 396.

Referring to FIG. 8, the circuit protection module 310 includes at least two terminals, or clips, such as terminals 362. The terminals 362 include circuit board connectors, or tabs, 406 extending away from opposing fuse clamp arms 408. The fuse clamp arms 408 are each coupled to a terminal base 410 at a fixed end proximate the terminal base, extend generally transversely from the base, and terminate at a free end away from the base.

The fuse clamp arms 408 are flexible to allow movement of the arms away from each other when pressure exceeding a biasing force of the arms is applied to the arms. The arms 408 are resilient in that they return to an un-stressed or un-flexed state when the pressure is released. The fuse clamp arms 408 include opposing curved recessed portions intermediate the fixed and free ends of the arms. Preferably, the curved recessed portions have a contour that approximately corresponds with the external surface of the ends 401, 403 of fuse 400. Further, the free ends of the fuse clamp arms 408 may have opposing beveled or angled surfaces generally facing each other and adjoining the recessed portions. In the un-stressed or un-flexed state, a maximum lateral distance between the opposing recessed portions and a minimum lateral distance between the beveled surfaces is smaller than an outer diameter of the ends 401, 403 of the fuse 400. Preferably, the maximum lateral distance between opposing recessed portions is greater than the minimum lateral distance between the beveled surfaces.

A pair of fuse clips 362 is attached to the printed circuit board 360 by inserting the circuit board connectors 306 into corresponding apertures, or plugs, 420 in the printed circuit board and securing the connectors to the printed circuit board, such as by soldering. In an exemplary embodiment, one of the pair of fuse terminals 362 is a power input fuse terminal and the plug 420 in which it is inserted is electrically connected to one of the power input connections via the printed circuit board circuitry. The other of the pair of fuse terminals 362 is a power output fuse terminal and the plug 420 in which it is inserted is electrically connected to a power output connection, and thus one or more power outlets 212 of the outlet modules 110, 112, via circuitry on the printed circuit board 360.

Referring to FIGS. 7 and 8, the fuse carrier 364 is shown in a closed position. In the closed position, the fuse receiving area 396 of the carrier 364 is disposed within the interior of the front panel 319 such that the fuse 400 retained within the fuse receiving area is correspondingly disposed within the interior of the housing.

In the event a user desires access to the fuse 400, the user can apply an outwardly directed pressure against the user engaging portion 368 of the fuse carrier 364 to rotate the carrier about an axis that is coaxial with the cylindrical portion 766 in a direction indicated by arrow 424. The carrier 364 can be rotated by the user in the direction indicated by arrow 424 until the fuse receiving area 396 of the carrier 364 is disposed outside of, or external to, the front panel 319 such that fuse 400 retained within the fuse receiving area is correspondingly disposed outside of the housing. In some implementations, the cylindrical portion 366 of the carrier 364 includes a stop 422 that contacts the carrier support surface 332 of the base 322 to prevent over-rotation of the carrier.

From the open position, a user can apply a pressure against the user engaging portion 368 of the fuse carrier 364 to rotate the carrier about an axis that is coaxial with the cylindrical portion 366 in a direction opposite that indicated by arrow 424. The carrier 364 can be rotated in this direction until a shoulder portion 426, which extends from the carrier body 380 and is coextensive with the outwardly facing surface 386 of the body, contacts the carrier support surface 332 to resist further rotation of the fuse carrier and to place the carrier in the closed position.

As the fuse carrier 364 is rotated from the open position to the closed position, the first and second ends 401, 403 of the fuse 400 contact respective beveled surfaces of the fuse clips 362. Since the maximum distance between at least a portion of the respective beveled surfaces of the clips is smaller than the outer diameter of the ends 401, 403 of the fuses, further rotation of the carrier 364 causes the first and second ends 401, 403 of the fuse 400 to slide against and apply pressure to the respective beveled surfaces of the clips 362. Such pressure, if greater than the biasing force of the clamp arms 408, urges the arms to move away from each other until the ends 401, 403 of the fuse 400 slide into the respective opposing curved recessed portions of the arms. The clamp arms 408, being resilient and biased toward the un-flexed state, then move toward each other to effectively clamp the ends 401, 403 of the fuse 400 between the recessed portions of the arms.

In the closed position, the power input fuse terminal is electrically connected to the first end 401 of fuse 400 and the power output fuse terminal is electrically connected to the second end 403 of the fuse. With functional, i.e., un-blown, fuses connected to the terminals in this manner, a closed circuit is formed between the power input and the power outlets 212. In other words, power from the power input can be transmitted to the power outlets 212 via the power input fuse terminal, the fuse, and the power output fuse terminal.

In preferred embodiments, the power distribution unit 312, or other electrical device, includes a fuse condition indicator so that the state of the fuse may be determined by visual inspection. The displays can be analog or digital displays and indicate the status of the one or more fuses or the level of power being transmitted to a particular bank of outlets. In some instances, if the level of power displayed falls below a predetermined level indicative of a blown fuse, a user can visually determine if the fuse is active or blown.

Although not shown, in some implementations, the fuse condition indicator is a light emitting diode (LED). The LED may be on or off in correspondence with the state of the fuse.

When a fuse is blown and/or requires replacement, the circuit protection module 310 can be used to easily disconnect and access the fuse without tools or disassembly. For example, if fuse 400 is blown, as indicated by a fuse condition indicator or otherwise determined, a user can rotate the carrier 364 from the closed position to the open position. This is accomplished by applying a pressure that exceeds the biasing force of the clamp arms 408 on the user engaging portion 368 in a direction indicated by arrow 424. Upon initial rotation of the carrier 364, the clamp arms 408 are urged away from each other by the fuse 400 as the fuse ends 401, 403 slide out of the respective opposing recessed portions 416 to effectively unclamp, i.e., disconnect, the fuse from the terminals 362. The carrier 364 can then be further rotated into the open position such that the fuse 400 is accessible at a location external to the front panel 319, thus retracting the fuse carrier from the closed position to the open position.

With the carrier in the open position, the user can manually access the fuse 400 and remove it from the carrier 364. A second fuse can then be inserted into and retained within the fuse receiving area 396 of the carrier 364 in place of the fuse 400. Finally, the user can rotate the carrier 364 from the open position into the closed position such that, the new fuse is connected to the terminals 362.

In some embodiments, the base 322 and carrier 364 are made from a non-conductive material, such as plastic, and can be manufactured using common molding techniques known in the art. However, in some embodiments, the base 322 is made from a conductive material. The terminals, e.g., terminal 362, is also be made from a conductive material. As used herein, a conductive material can be any of various conductive materials, such as a conductive metal or metal alloy. For example, in some implementations, the conductive material is one or more of copper, nickel and aluminum.

Although the circuit protection module 310, of the present disclosure is shown and described as having a single carrier 364 facilitating access to a single fuse 400, in other embodiments, the circuit protection module has more than one carrier for accessing more than one fuse. For example, a circuit protection module can have two carriers in tandem min a side-by-side relationship, with each carrier providing access to a separate fuse.

3. Third Embodiment

Figure 9:
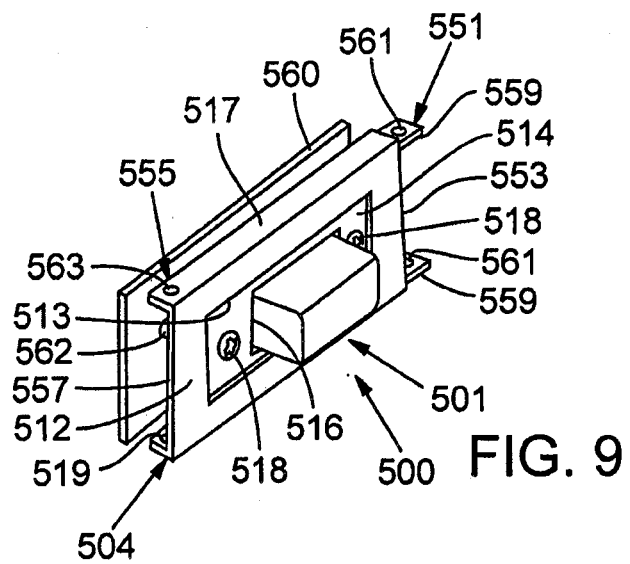
FIG. 9 is a perspective view of a third embodiment of a circuit protection module for use with the power distribution unit of FIG. 1.
Figure 10:
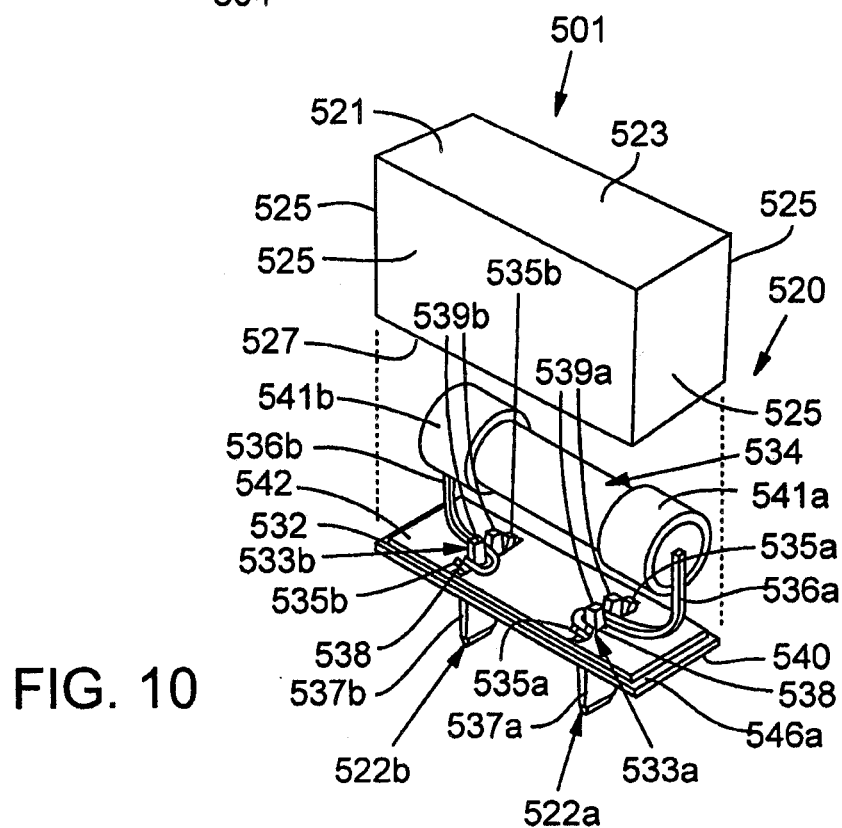
FIG. 10 is a perspective view of a fuse holder of the circuit protection module of FIG. 9 shown with a housing cover removed.
Figure 11:
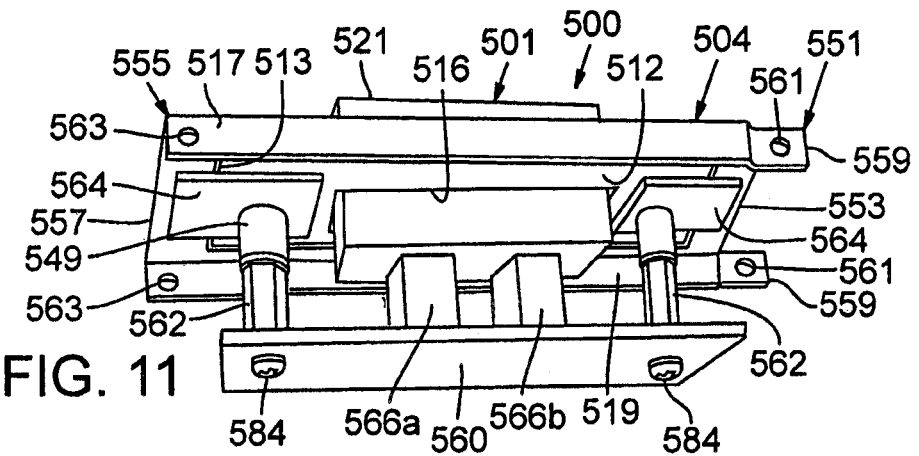
FIG. 11 is a perspective rear view of the circuit protection module of FIG. 9.

According to another embodiment, the circuit protection module can be circuit protection module 500 as shown in FIGS. 9-11. Circuit protection modules of the present disclosure, such as circuit protection modules 114, 310 can be replaced by or coupled to circuit protection module 500.

Generally, circuit protection module 500 includes a removably attachable fuse holder that protects and houses, holds, or otherwise carries, a fuse for use with the fused electrical apparatus. The fuse holder is easily attached, or otherwise coupled, to the module to electrically couple a fuse carried by the holder to the fused electrical apparatus and easily detached, or otherwise decoupled, from the module to electrically decouple the fuse from the apparatus. As used herein, the term "removably attachable" is defined to mean easily removable or easily detachable from an object, and easily attachable to an object, without violence to the holder or the object such that the holder and the object remain functional.

Referring to FIG. 9, circuit protection module 500 includes a fuse holder 501 that is at least partially mounted within a fuse access passage, or aperture, 513 formed in a front panel 504. The front panel 504 can include a front wall 512 and two side walls 517, 519 extending the length of and transversely from the front wall. The circuit protection module 500 includes a module connector element 551 proximate a leading edge 553 of the front panel 504 and a module connector element 555 proximate a trailing edge 557 of the front panel. The module connector element 551 includes a pair of tabs 559 with respective apertures 561 and the module connector element 555 includes apertures 563 formed in the side walls 517, 519 of the front panel 504. The leading end module connector element 551 and the trailing end modular connector element 555 are matingly engageable with respective trailing end connector elements and leading end connector elements of any of various modules, such as those described above.

As shown, in some implementations, the fuse access passage 513 can be generally rectangular shaped. The circuit protection module 500 includes a mounting plate 514. The mounting plate 514 can have, for example, a generally rectangular shape and fit at least partially within or over the fuse access passage 513. In some implementations, the mounting plate has an outer perimeter just smaller than an outer perimeter of the passage 513 such that the mounting plate is matingly received within the passage. The mounting plate 514 can be secured to the front panel 504 by a fastening mechanism, such as fasteners 518, and have a fuse holder access opening 516 through which a fuse holder, such as fuse holder 501, can extend.

The fuse holder of the present application is configured to house, i.e., support and at least partially enclose, a fuse for use in a fused electrical apparatus. Referring to FIG. 10, an exemplary embodiment of one implementation of a fuse holder is shown. The fuse holder 501 includes, for example, a housing 520 supporting and enclosing a fuse, and a pair of power terminals 522a, 522b extending from the housing and electrically coupled to a fuse disposed within the fuse holder housing.

In the illustrated implementation, the housing 520 includes a cover 521 coupled to a base 532. The cover 521 can comprise an at least partially enclosed shape, such as a generally rectangular box shape as shown, having an open side or face. The closed sides or surface of the cover 521 define a volume, cavity, space or hollow portion (not specifically shown) between the sides. In the exemplary embodiment, the cover 521 includes a planar closed end 523 and four generally planar sides 525 extending generally transversely or perpendicularly from the closed end and terminating at a generally rectangular-shaped open end 527 opposite the closed end. Two of such sides are parallel to, and extend perpendicularly from, the two other parallel sides. In this implementation, the cavity defined between the closed end 523 and the four sides 525 of the cover 521 has a generally rectangular prism shape.

The base 532 is configured to at least partially cover the open end 527 of the cover 521 such that when coupled to the base, a fuse is capable of being disposed in the area defined between the base and the cover, e.g., within the cavity of the cover. As shown, in certain implementations, the base 532 of the fuse holder 501, when coupled to the cover 521, is configured to at least substantially cover the open end 527 of the cover. For example, in the illustrated implementations, the base 532 is a generally plate-like element having a generally rectangular-shaped outer perimeter corresponding to the rectangular shape of the open end 527 of the cover 521.

In some implementations, the base 532 can have, for example, a shelved, or lipped, portion 546 formed in the internal surface 542 of the base and extending around the perimeter of the base. In the illustrated implementations, the open end 527 matingly engages the shelved portion 546 of the base 532 such that the outer surfaces of the sides 525 of the cover are approximately flush with the outer perimeter of the base 532 when the cover is coupled to the base.

A cover, such as cover 521, can be coupled to a base, such as base 532, by any of various coupling techniques. For example, the edges of the cover 521 adjacent the cavity of the cover can be adhered to the base 532 by application of an adhesive between the cover and the base. Although not shown, it is recognized that in other implementations, the cover 521 can be coupled to the base 532 by any of various fastening mechanisms known in the art, such as a nut and bolt arrangement, mating snap-fit elements formed in the cover and base, or a hinged arrangement.

In the illustrated embodiment, the power terminals 522a, 522b are coupled to and extend from the base 532. The power terminals 522a, 522b are coupled to the base 532 at first, end portions 533a, 533b, respectively, and extend transversely from an external surface 540 of the base, opposite an internal surface 542, in a direction away from the housing 520. The power terminals 522a, 522b include second end portions, or prongs, 537a, 537b generally opposite the first end portions 533a, 533b. The prongs 537a, 537b are configured to be received in an electrical power receptacle as will be described in more detail below. For example, as shown, the prongs 537a, 537b can be a generally rectangular-shaped plate-like element sized to extend through a generally rectangular shaped receptacle. In other implementations, the prongs can be shaped and sized to be received in receptacles having sockets with shapes and sizes corresponding to the shapes and sizes of the prongs.

To accommodate coupling the terminals 522a, 522b to the base 532, the base can include, for example, terminal passageways 538 penetrating the base. The first end portions 533a, 533b of each terminal 522a, 522b, respectively, extends through a respective passageway 538 and, in one exemplary implementation, can be secured to the base 532 in a snap-fit type arrangement. For example, as shown in FIG. 10, the first end portions 533a, 533b of terminals 522a, 522b, respectively, include respective resilient tabs 535a, 535b resiliently movable relative to each other. When in an unflexed state, the tables 535a, 535b are spaced apart from each other a distance greater than a major dimension of the passageway 538 formed in the base 532.

The terminals 522a, 522b can be coupled to the base by first applying an inwardly directed pressure to the respective tabs 535a, 535b to move the tabs toward each other. With the tabs 535a, 535b in this position, the first end portions 533a, 533b of the terminals 522a, 522b, respectively, can be extended up through a respective one of the passageways 538 in a direction from the outer surface 540 toward the internal surface 542 of the base 532 until at least a portion of the tabs 535a, 535b extend past the interior surface 542 of the base 532. With the terminals 522a, 522b in this position, the inwardly directed pressure applied to the tabs 535a, 535b can be removed to allow the tabs to move away from each other and at least partially contact the internal surface 542 of the base. Further, the prongs 537a, 537b can have a major dimension greater than the major dimension of the passageways 538. In this manner, the base 532 is disposed between the resilient tabs 535a, 525b and prongs 537a, 537b of terminals 522a, 522b, respectively, to effectively secure the terminals to the base.

In alternative embodiments, the terminals 522a, 522b can be coupled to the base 532 by any of various known connecting mechanisms or techniques. For example, in some implementations, the terminals can be connected to the base by soldering or through use of one or more fasteners or fastener assemblies.

Preferably, the terminals 522a, 522b are coupled to the base 532 such that at least a portion of the first end portions 533a, 533b of the respective terminals are at least partially exposed to the interior cavity of the housing. For example, as shown in FIG. 32, the first end portions 533a, 533b of the respective terminals 522a, 522b have spaced-apart fuse connector tabs 539a, 539b, respectively, disposed within the housing cavity. The tabs 539a, 539b can extend approximately transversely to the interior surface 542 of the base 532.

The fuse connector tabs 539a, 539b are spaced-apart to receive a portion of respective electrically conductive fuse connectors, e.g., wires 536a, 536b, between and in contact with a corresponding tab. The wires 536a, 536b are electrically coupled to the terminals 522a, 522b, respectively, on one end and respective opposing conductive ends 541a, 541b of a fuse 534 on the opposite end.

Fuses as used herein can be any of various fuses known in the art. For example, in some embodiments, the fuse is capable of providing, or rated for, branch circuit protection in a power distribution system according to the National Electrical Code (NEC). In specific implementations, the fuse, such as fuse 534, can be a cartridge-type fuse, such as, for example, a Bussmann SC20 fuse or a Littlefuse SLC20 fuse.

Further, although a fuse holder housing a single fuse is shown, it is recognized that for some applications, a holder can house two or more fuses.

In the illustrated embodiment, wires 536a, 536b are electrically coupled to terminals 522a, 522b, respectively. For example, the portion of the wires 536a, 536b between the tabs 539a, 539b can be soldered to the tabs. In other implementations, the fuse connectors can be electrically coupled to the terminals 522a, 522b through use of other known connecting mechanisms, such as conductive fasteners fastening a respective connector and terminal to each other.

The fuse connectors, e.g., wires 536a, 536b, can be at least partially rigid to secure the fuse 534 in place within the housing cavity and away from the terminals 522a, 522b for preventing inadvertent electrical contact between the fuse and the terminals. In some implementations, the connectors can be conductive plate-like elements or any other appropriate conductive partially rigid element.

It is also recognized that in some embodiments, a separately connectible fuse connector as described herein need not be used. For example, the electrically conductive fuse connectors can be formed integral with or as a one-piece monolithic construction with the terminals. More specifically, the terminals can be lugs or clips, each having two resiliently opposed prongs for receiving and removably containing a respective end of the fuse.

As described above, in the illustrated embodiment, terminal 522a is electrically coupled to conductive end 541b of fuse 534 via a fuse connector and terminal 522b is electrically coupled to conductive end 541a of the fuse via a fuse connector. In this manner, when the fuse 534 is conductive, i.e., not blown, the terminals 522a, 522b are electrically connectable via the fuse.

In assembly, the terminals 522a, 522b, fuse connectors, e.g., wires 536a, 536b, and fuse 534 can first be coupled to the base 542. The cover 524 is then placed over the fuse 534 and fuse connectors and coupled to the base 532 such that the fuse 534, wires 536a, 536b and first end portions 535a, 535b of the terminals 522a, 522b, respectively, are disposed within the housing cavity. Accordingly, when the cover 521 is coupled to the base 532 to form the housing 520, the base effectively seals the open end 527 of the cover such that the housing prevents damage to and inadvertent electrical contact with the fuse 534 by external objects.

In certain implementations, the cover 521 of the circuit protection module 500 is at least partially opaque and in some implementations, can be black and substantially opaque. In such embodiments, a fuse condition indicator, such as described above, can be associated with the circuit protection module 500 to determine the condition of a fuse. In other specific embodiments, the cover 521 of the circuit protection module 500 is at least partially clear or transparent, such that the condition of the fuse can be determined by visual inspection in addition to or instead of a fuse condition indicator.

Referring now to FIG. 11, the circuit protection modules, for example, circuit protection module 500, can include a printed circuit board 560 disposed within the front panel 504. The front panel 504 includes module mounting elements for facilitating mounting of the circuit protection module 500 to the housing. The circuit protection module mounting elements can be, for example, a pair of tabs 564 each mounted, such as by spot welding, to an interior surface of the housing adjacent longitudinally opposite ends of the passageway 513. The tabs 564 comprise a plate-like element with each tab having an opening 547 penetrating the respective tab. The tabs 564 are positioned such that a portion of the tabs 564 including the opening 547 extends into the passageway 513.

A threaded nut 549 can be mounted to an interior surface of each of the tabs in alignment with the openings 547.

In some embodiments, the mounting elements can be coupled to or formed as a monolithic one-piece construction with the power distribution unit front panel 504. For example, the passageway 513 can include a recessed portion.

The mounting plate 514 of circuit protection module 500 includes openings (not shown) corresponding to and alignable with the openings 547 formed in the tabs 564. The mounting plate 514 can be disposed at least partially within the passageway 513 and secured to the mounting elements, such as tabs 564, by inserting fasteners, such fasteners 518, through the openings 547 in the mounting plate and mounting elements and threadably tightening the fasteners to the nuts 549.

Referring to FIG. 9, in some implementations having mounting elements, such as tabs, when the mounting plate 514 is mounted to the front panel 504, an external surface the plate can be substantially flush with an outer surface of the housing.

Although the illustrated embodiment show the mounting plate 514 mounted within the passageway 513 through use of mounting elements, it is recognized that the mounting plate can be mounted over the passageway 513. Similar to the window described in relation to FIGS. 1, 2 and 6, the mounting plate can be mounted over the passageway 513 using fasteners that extend through openings adjacent the passageway.

In the illustrated implementation, the printed circuit board 560 is mountable to the front panel 504 adjacent the passageway 513 and extends generally parallel to side 512. In specific implementations, the printed circuit board 560 can be mounted to the front panel 504 by fasteners 584 extending through openings in the printed circuit board and threadably engaging the housing or elements coupled to the housing, such as nuts 549.

In some implementations, the printed circuit board 560 is mounted such that the board is spaced-apart from the side wall 512 by spacer elements, such as stand-off fasteners 562, and a fastening element, such as nut 549, with a male end portion of each stand-off fastener fastened to the nut 549. The fasteners 584 can extend through the printed circuit board 560 and threadably engage a female end portion of the stand-off fasteners 562. In other implementations, it is recognized that the printed circuit board can be mounted in a spaced-apart relationship with a side of the housing other known fastening mechanisms and techniques. For example, a stand-off fastener or spacer can be mounted directly to the mounting plate 514. The fasteners 584 could then be used to fasten the printed circuit board 560 to the stand-off fastener or spacer.

In the exemplary embodiment, the circuit protection module 500 can include electrical fittings, e.g., receptacles 566a, 566b, having sockets, or openings (not shown). The receptacles 566a, 566b are mounted to the printed circuit board 560 adjacent the fuse holder access opening 516 such that the receptacles can be easily accessible through the opening 516. The receptacles 566a, 566b are electrically coupled with one or more electrical circuits on or in the printed circuit board. The receptacles and circuits can be electrically coupled, for example, via conductive elements (not shown) disposed within the sockets of the receptacles and extending from the receptacles to electrically contact one or more electrical circuits. In one implementation, receptacle 566a is electrically coupled to an electrical circuit, e.g., power input circuit line, on the printed circuit board, which is electrically coupled to an electrical power supply input. Similarly, receptacle 566b can be electrically coupled to an electrical circuit, e.g., power output circuit line, on the printed circuit board, which is electrically coupled to power outlet bank 508*a*.

When the holder 501 is inserted into the fuse holder access opening 516 in the mounting plate 514, the receptacles 566*a*, 566*b* are sized, shaped and positioned to matingly receive prongs 537*a*, 537*b*, respectively, of the respective fuse holder terminals 522*a*, 522*b*.

When inserted into the receptacles 566*a*, 566*b*, the terminals 522*a*, 522*b* contact the conductive elements within the receptacles to electrically couple the terminals 522*a*, 522*b* with the receptacles 566*a*, 566*b*, respectively, and thus one or more electrical circuits of the printed circuit board. Accordingly, when fuse 534 of holder 500 is in a conductive state, a closed circuit is formed between the electrical power supply input and the outlet bank 508*a*. In other words, power supplied by the electrical power supply input is transmitted to the outlet bank 508*a* via the receptacle 566*a*, terminal 522*a*, fuse 534, terminal 522*b* and receptacle 566*b*.

When fuse 534 of circuit protection module 500 is determined to be blown, either by a fuse condition indicator or by visual inspection, the fuse holder 501 can be replaced by a fuse holder of the same type having an operable fuse. More specifically, the fuse holder 501 housing the blown fuse can be unplugged, removed, or otherwise electrically disconnected, from the receptacles 566*a*, 566*b* by manually grasping and pulling the holder away from the front panel 504. A new fuse holder having an operable fuse can then be plugged into the receptacles 566*a*, 566*b* to replace the old fuse holder. In this manner, the fuse holder, as described herein, can be easily replaced by a new holder without tools and without requiring disassembly of the PDU.

Although embodiments of a circuit protection module having only one fuse holder is shown, it is recognized that in some embodiments, a circuit protection module can have two or more holders. Further, for circuit protection modules having more than one holder, the holders need not be located longitudinally adjacent each other as shown, but can be arranged laterally adjacent each other.

It is recognized that the fuse holders of the present disclosure can be made from relatively inexpensive materials such that replacing a holder having a blown fuse with a holder having an operable fuse is not cost prohibitive. For example, the housing, e.g., the cover and the base, can be made from an inexpensive polymeric material, such as hardened plastic. Further, the terminals and fuse connectors can be made from an inexpensive conductive material, such as copper or nickel.

4. Fourth Embodiment

Figure 16:
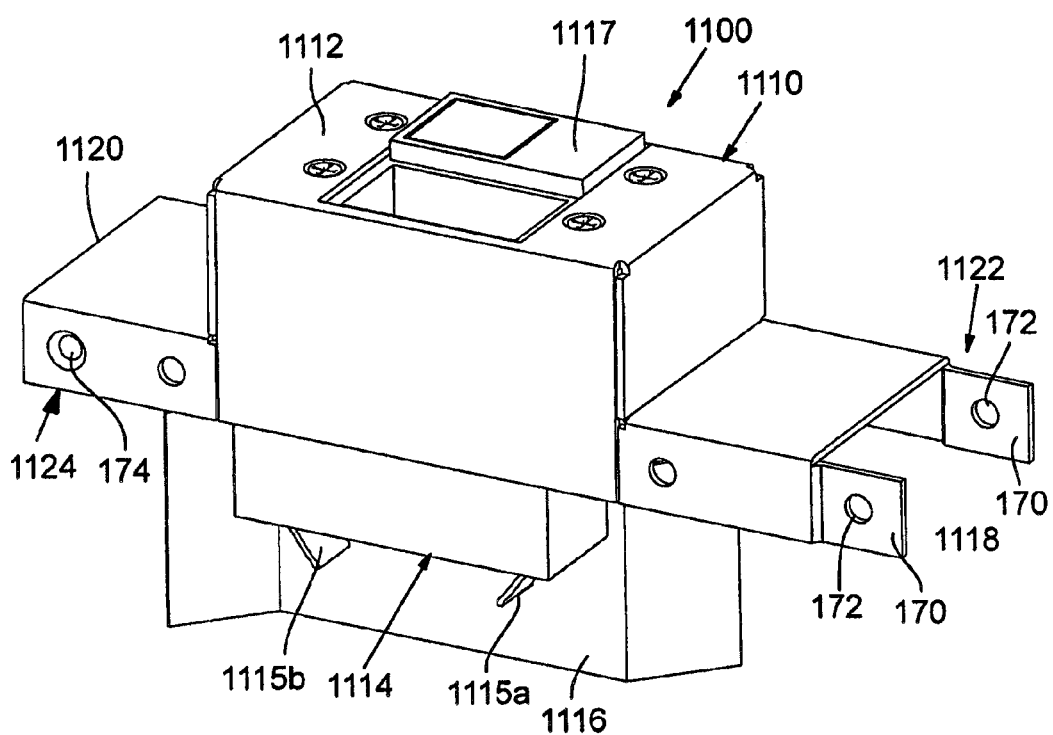
FIG. 16 is a perspective view of a fourth embodiment of a circuit protection module.

According to a fourth embodiment, the circuit protection module is a circuit breaker module, such as circuit breaker module 1100 shown in FIG. 16. Circuit protection module 1100 includes a front panel 1110 having a leading end 1118, a trailing end 1120, and a circuit breaker housing portion 112 intermediate the leading and trailing ends.

A circuit breaker, such as circuit breaker 1114, which can be a circuit breaker commonly known in the art, is mounted at least partially within the circuit breaker housing portion 1112 using any of various known mounting techniques. The circuit breaker 1114 includes a first pair of terminals 1115*a*, 1115*b* and a second pair of terminals (not shown). Each terminal receives a line component conductor, such as a wire. For example, one of terminals 1115*a*, 1115*b* is electrically coupled to a power input from a power source via a first line component conductor and the other of terminals 1115*a*, 1115*b* is electrically coupled to one or more outlet modules.

In this manner, power from a power source is transmitted to one or more outlet modules via the circuit breaker 1114 of circuit breaker module 1100.

As shown, the circuit breaker 1114 is a dual pole ganged breaker for providing overcurrent protection for a PDU in power receiving communication with a dual line power source. An insulator 1 16 is positioned between the first pair of terminals and the second pair of terminals to insulate the first pair of terminals from the second pair of terminals. If the circuit breaker 1114 is tripped, it can be reset using a single switch or lever 1117.

Although not shown, the circuit breaker can be a single pole breaker for providing overcurrent protection for a PDU in power receiving communication with a single line power source.

As with the some of the other modules described herein, circuit breaker module 1110 includes a module connector element 1122 proximate its leading end 1118 and a module connector element 1124 proximate its trailing end 1120. The module connector element 1122 includes a pair of tabs 170 each having an aperture 172. The module connector element 1124 includes a pair of apertures 174.

The module connector element 1122 is configured to matingly and removably engage the module connector element of an adjacent module and the module connector element 1124 is configured to matingly and removably engage the first module connector element of an adjacent module in the same or similar manner as described above.

Power Input Modules

Referring to FIGS. 1-3, the power input module 116 include a front panel, or section, 148. As described above, the front panel 148 includes the module connector element 142 proximate the trailing end 168 of the front panel. The module connector element 142 includes a pair of apertures 174 each formed in a respective one of sidewalls 652, 654 extending transversely from a front wall 656 of the front panel 148. The sidewalls 652, 654 extend generally transversely from a front wall 656. The front panel 148 can also include a leading end 169 generally opposite the trailing end 168. In some implementations, an input power wire is coupled to the input power module 116 via an aperture (not shown) in the panel housing 124. The front panel 148 proximate the leading end 169 includes an opening 658 configured to receive a ground connection, e.g., ground wire, (not shown).

Although the power input module shown has a single module connector element proximate the trailing end, in other embodiments, the power input module can have a connector element proximate the leading end instead of, or in addition to, the module connector element proximate the trailing end. Accordingly, in some embodiments, the power input module can be connected to and between two adjacent modules.

Referring to FIG. 3, the power input module 116 includes a circuit board 609 having circuitry for routing and distributing the power components of the power source. The circuit board 609 can be mounted to and spaced apart from the front panel 148 using conventional fastening and stand-off techniques, such as described above.

The power input module 116 can be connected to an adjacent module, such as outlet module 112, by matingly receiving the module connector tabs proximate the leading edge of the adjacent module within the module connector element 142 proximate the trailing end 168. With the apertures 174 of the module connector element 142 aligned with the apertures of the tabs of the mated module connector, fasteners can be inserted through and engage the apertures of the connector element 142 and tabs of the adjacent module to tighten the front panel 148 to the front panel of the adjacent module.

In some embodiments, the power input module is configured for use with a single-phase power input. In other embodiments, the power input module is configured for a three-phase power input.

Although not shown, in some embodiments, an aperture can be formed in the front panel of the power input module to receive a power inlet, such as a 5-20P type power inlet.

Display Modules

Referring to FIGS. 1-3 and 12, the front panel, or section, 147 of display module 118 includes a front wall 700 and two sidewalls 702, 704 extending along the length of the front wall and transversely from the front wall. The front wall 700 includes a display aperture 707 for receiving a current indicator display, such as LED display 709.

Figure 12:
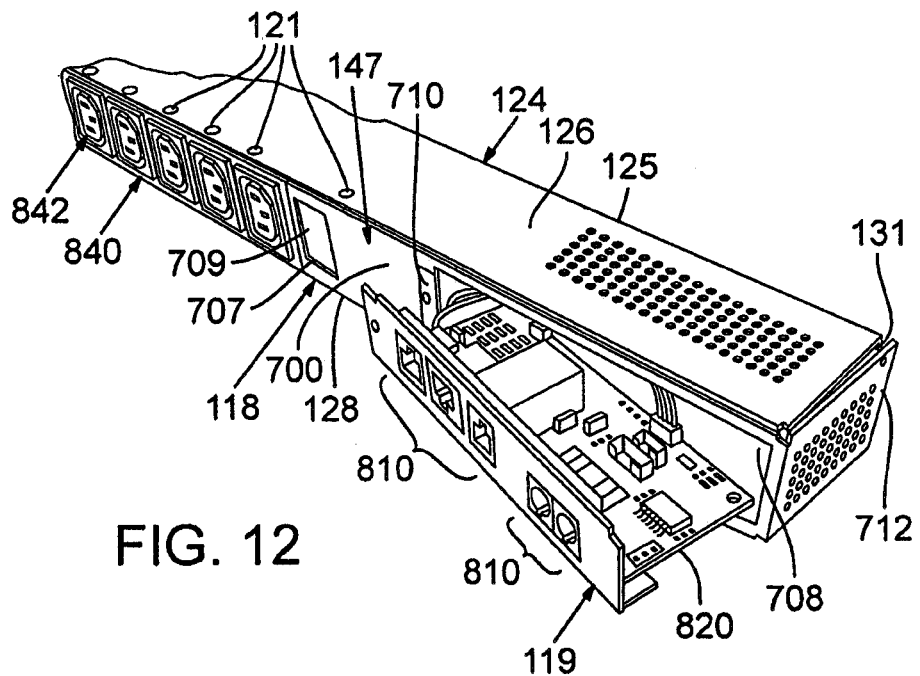
FIG. 12 is a perspective view of a display module of the power distribution unit of FIG. 1 shown with a communications I/O module partially removed.

Referring to FIG. 12, a communications I/O module aperture 708 configured to removably receive and retain a communications I/O module; as will be described in more detail below, is formed in the front wall 700 of the front panel 147. The front panel 147 includes an aperture 710 positioned adjacent the communications I/O module aperture 708. The aperture 710 can have internal threads for receiving a fastener to secure a communications I/O module at least partially within the I/O module aperture 708.

As described above, the front panel 147 includes module connector element 128 proximate the leading end 162 of the front panel. The module connector element 128 includes tabs 170 offset from the sidewalls 702, 704. The tabs each include aperture 172. In the illustrated embodiment, the front panel 1 147 includes a PDU end cover 712 extending transversely from the front wall 700. Instead of an end cover, in some embodiments, the front panel can include a module connector element proximate the trailing end and an adjacent module such that a module can be removably connected to the front panel at the trailing end. Alternatively, in some embodiments, the PDU cover 124 can include the end cover.

The display module 118 can be connected to an adjacent module, such as outlet module 110 (see FIGS. 1 and 2) or outlet module 840 (see FIG. 12) which is similar to outlet module 110 but includes IEC-type outlets 840 instead of NEMA-type outlets, by matingly positioning the module connector element, such as apertures, proximate the trailing edge of the adjacent module about the tabs 170 and apertures 172 of the module connector element 128 proximate the leading end 162 of the front panel 147. With the apertures 172 of the tabs 170 aligned with the apertures of the module connector of the adjacent module, fasteners can be inserted through and engage respective apertures to tighten the front panel 147 to the front panel of the adjacent module.

Although not shown, the front panel 147 of the display module 118 can include three display apertures 707 for three current indicator displays, such as for 3-phase power distribution applications.

Communications I/O Modules

As shown in FIGS. 1, 2 and 12, communications I/O, i.e., input/output, module 119 can be removably received within a communications I/O module aperture, such as aperture 708, of a display module, such as display module 118. The communications I/O module 119 can include one or more communications ports or interfaces 810 for connecting to various external devices, such as, for example, environmental sensing devices, data communications equipment, network computing equipment, and other PDUs. The communications I/O module can include at least one printed circuit board, such as printed circuit board 820, containing circuitry for transmitting data between the components of the PDU and the various ports or interfaces.

Although the communications I/O module described above is configured to be received in an aperture formed in a front panel of a display module, in some embodiments, the communications I/O module can be configured to removably connect to adjacent modules in a manner similar to that described above in relation to the other modules. In other words, the communications I/O module can have a front panel, or section, with a leading end and a trailing end. The leading end can have a module connector element for matingly attaching to a module connector element of the trailing end of an adjacent module, and the trailing end can have a module connector element for matingly attaching to a module connector element of the leading end of an adjacent module. Or, alternatively, the communications I/O module can have a module connector element either proximate the leading end or trailing end of the module. In such embodiments, the display module need not have an aperture for receiving a communications I/O module.

In some embodiments, the components and features of the communications I/O module can be integrated into the display module to form a single display and communication I/O output module. In other words, the communications I/O module can be permanently integrated into the display module.

In some embodiments, the component portion of one PDU can control and monitor power to one or more other PDUs. For example, in some embodiments, PDU 100 operates as a "master" controller and other linked PDUs, or other devices, linked to the master controller operate as "slave" controller.

The master controller can control one or more slave controllers via one or more of the communications ports of the communications I/O module, such as one or more of ports 810. In some implementations, one or more of the communication ports can be conventional telephone ports (e.g., an RJ-12 port). In other implementations, the port can be an Ethernet cable port or a wireless transmitter or receiver.

In some embodiments, the master controller and a slave controller operate in a master-slave relationship. When connected, the master controller controls, or drives, the slave controller by communicating with various devices, such as outlets, and sensors located on the slave controller. For example, the master controller can be electrically coupled to the slave controller via a telephone cord plugged into one of the communications ports of the communications I/O modules of the master and slave controllers to drive the slave controller, e.g., drive displays and outlets of the slave controller. When disconnected from the master controller the slave controller returns to driving its displays and outlets independent of the master controller.

Further, when connected, the master controller can operate to transmit information, such as information concerning the power consumption by the slave controller, to external devices, such as network devices, via network port, such as one of the communications ports 810.

Providing a master controller capable of driving one or more slave controllers can provide certain advantages. For example, such a configuration can allow for increased extensibility or expandability in providing power distribution to electronic equipment. More specifically, in certain applications, such as when dictated by network constraints, the master controller can be "linked" to the slave controller to effectively provide monitoring for two devices through the interface ports of a single device.

In some implementations, the master controller and slave controller can operate in a master-slave relationship as described in, with particular reference to FIGS. 1, 2A, 2B, 9, and 10 of U.S. patent application Ser. No. 11/459,011, filed Jul. 20, 2006, which is incorporated herein by reference.

Wiring

Figure 13A:
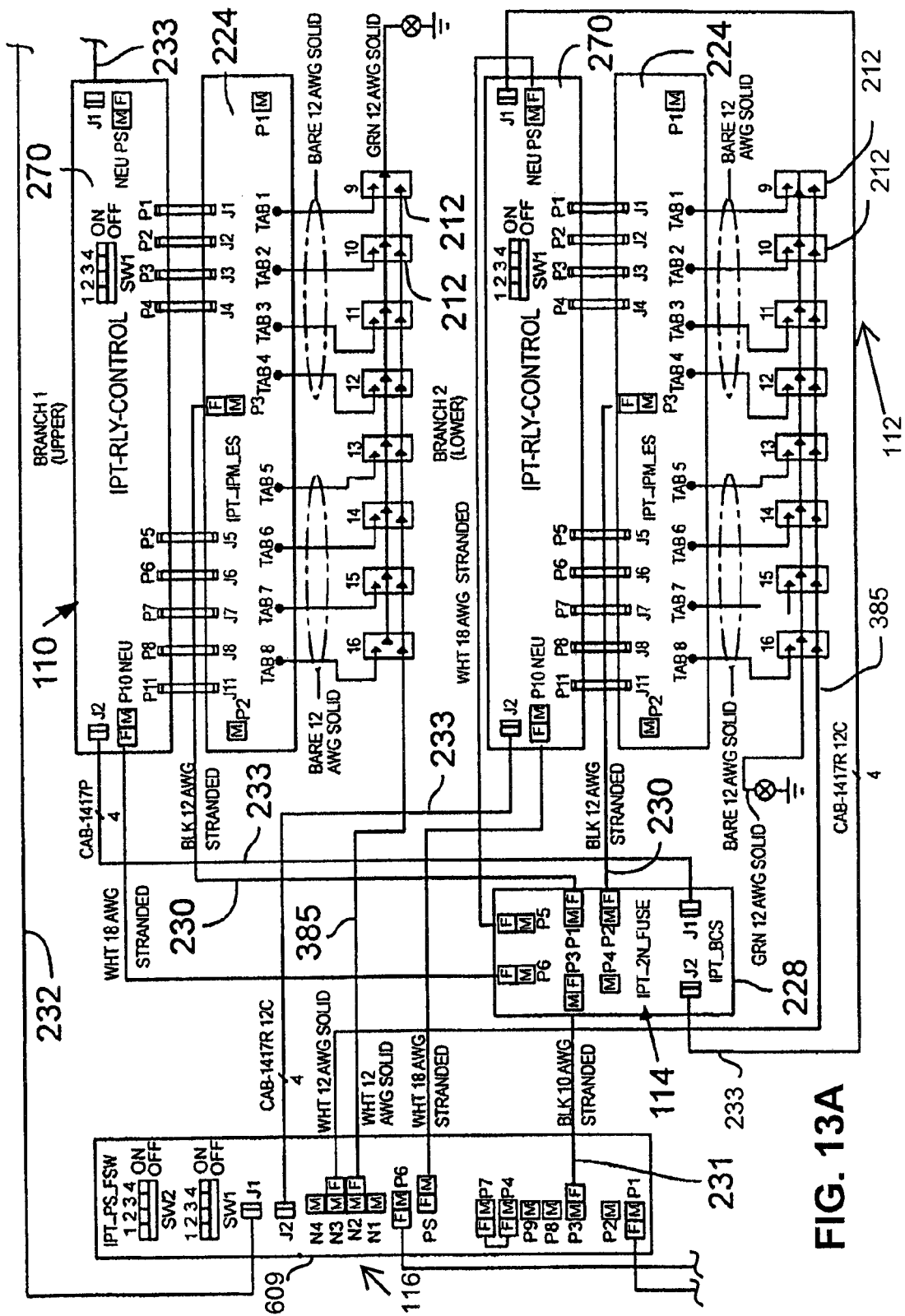
FIG. 13A is a schematic diagram of one embodiment of a wiring configuration for the power distribution unit of FIG. 1.
Figure 13B:
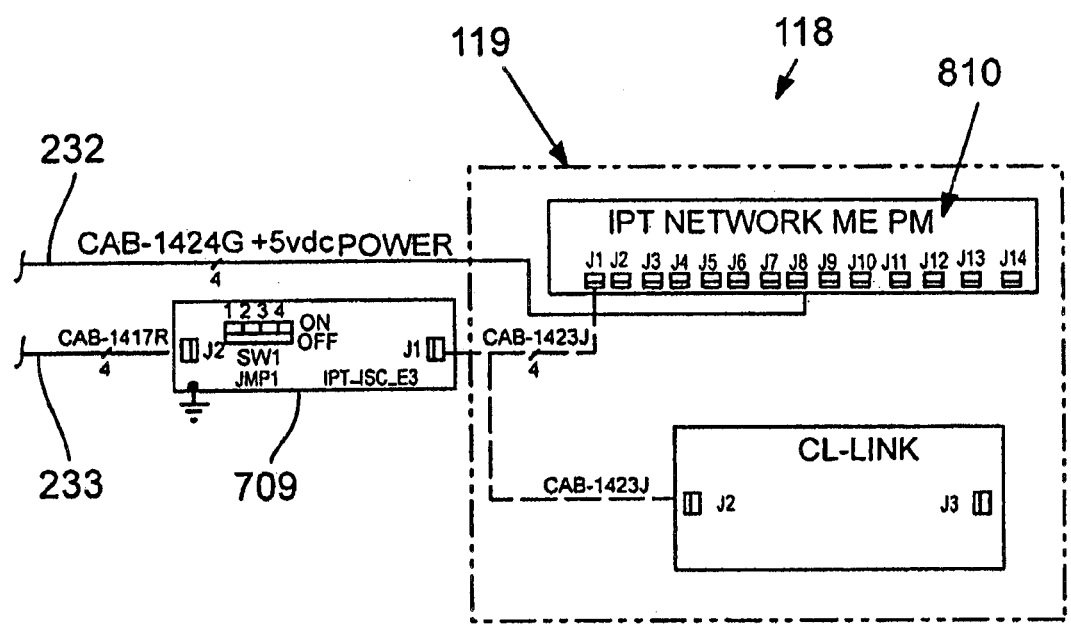
FIG. 13B is a continuation of the schematic diagram of FIG. 13A.
Figure 13C:
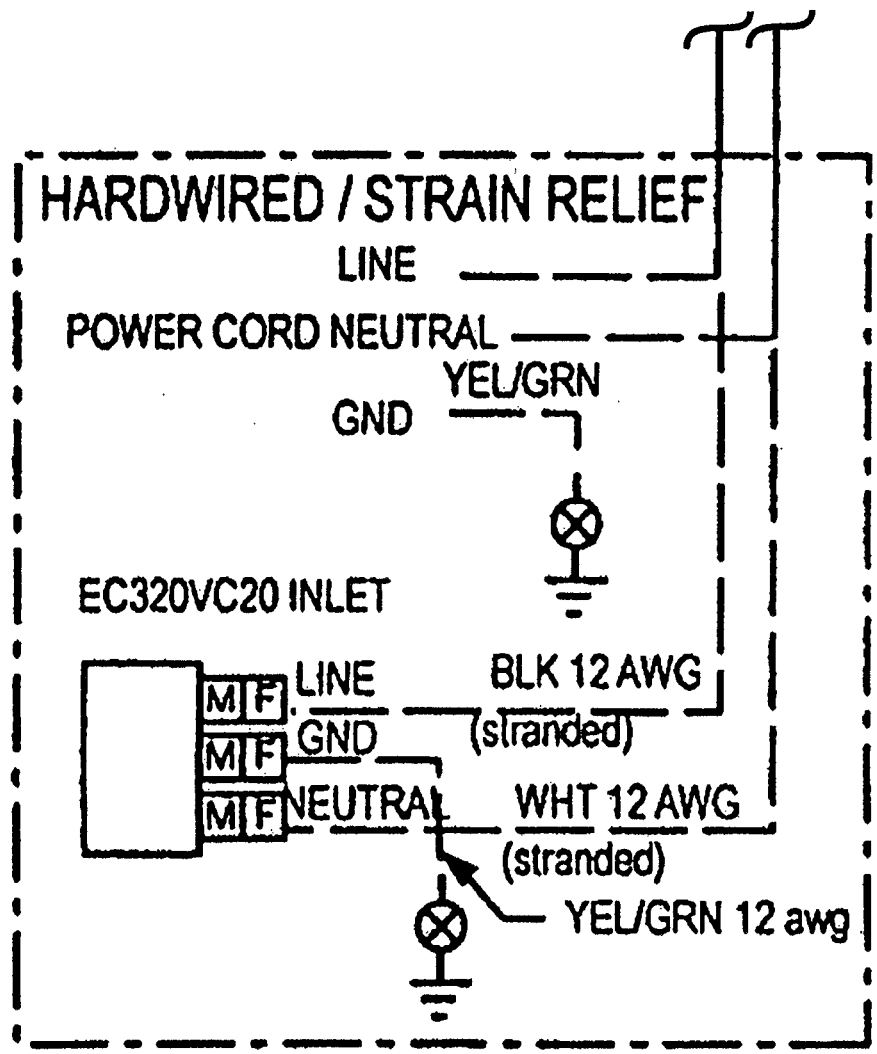
FIG. 13C is a continuation of the schematic diagram of FIG. 13A.
Figure 14:
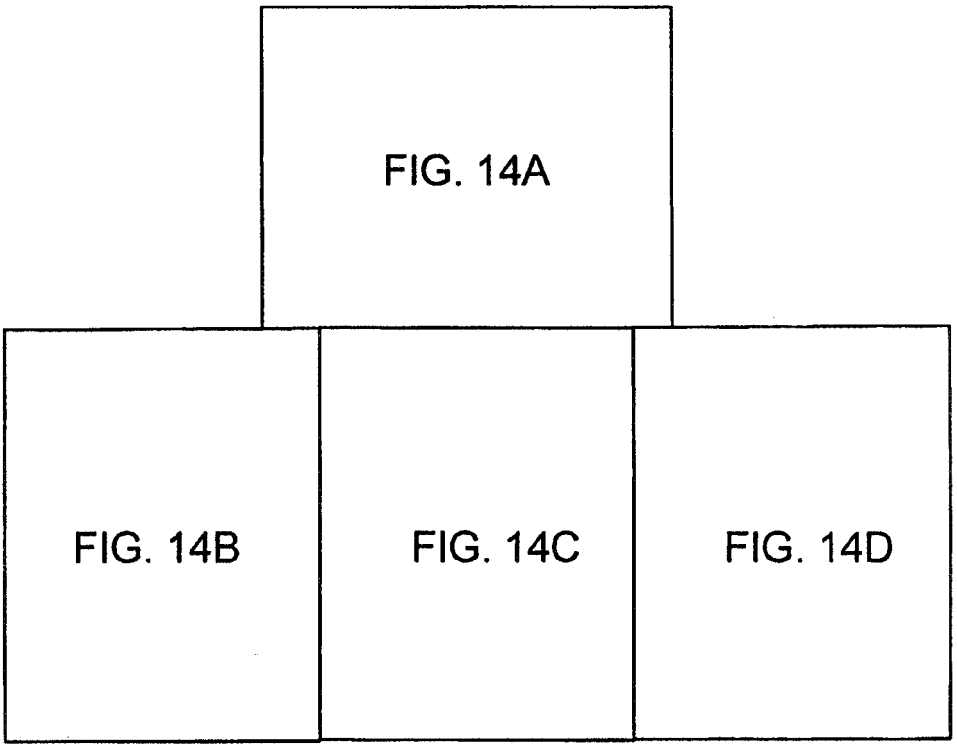
FIG. 14 is a block diagram of one embodiment of a wiring configuration for a three-phase power distribution unit.
Figure 14A:
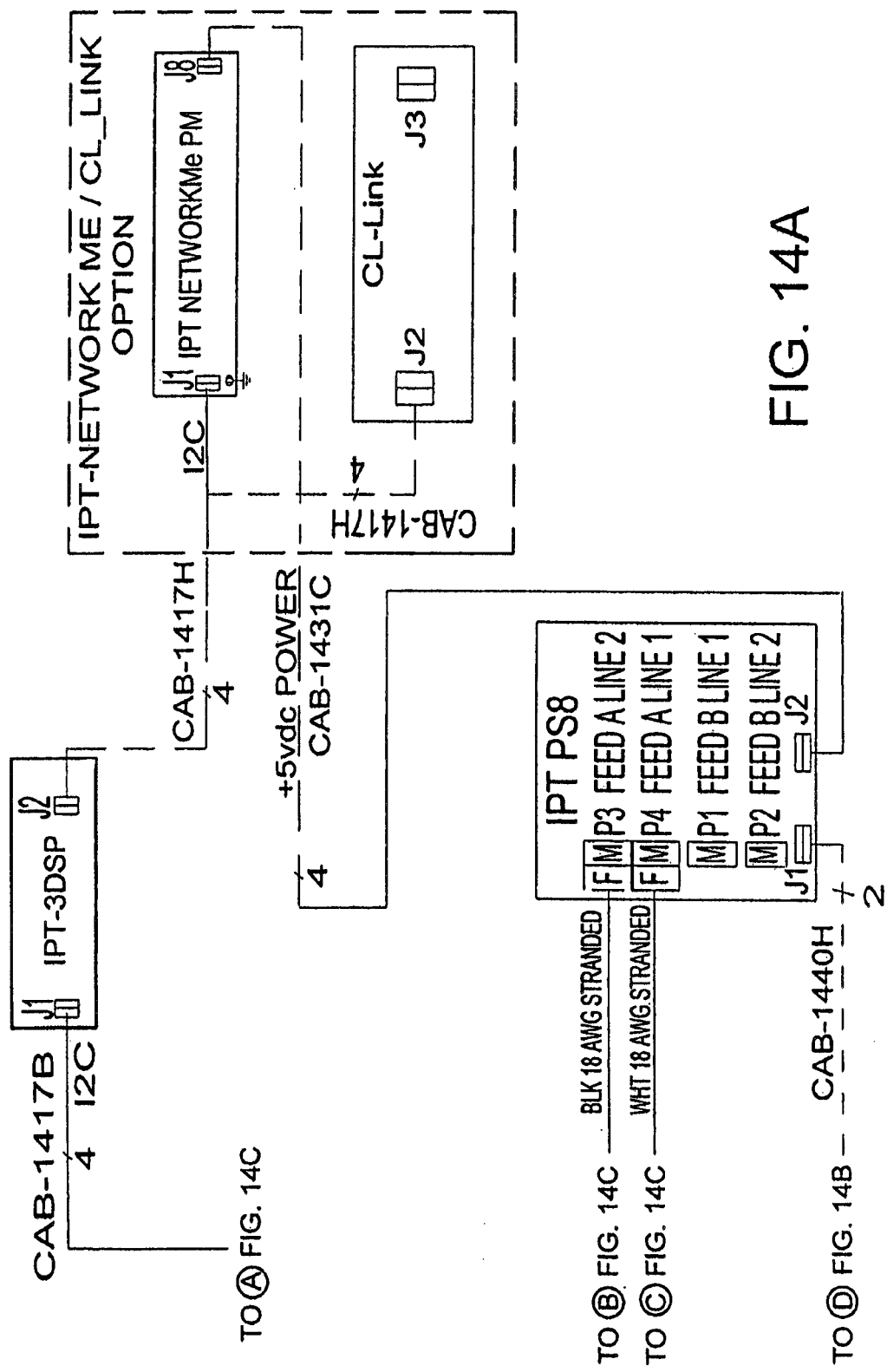
Figure 14B:
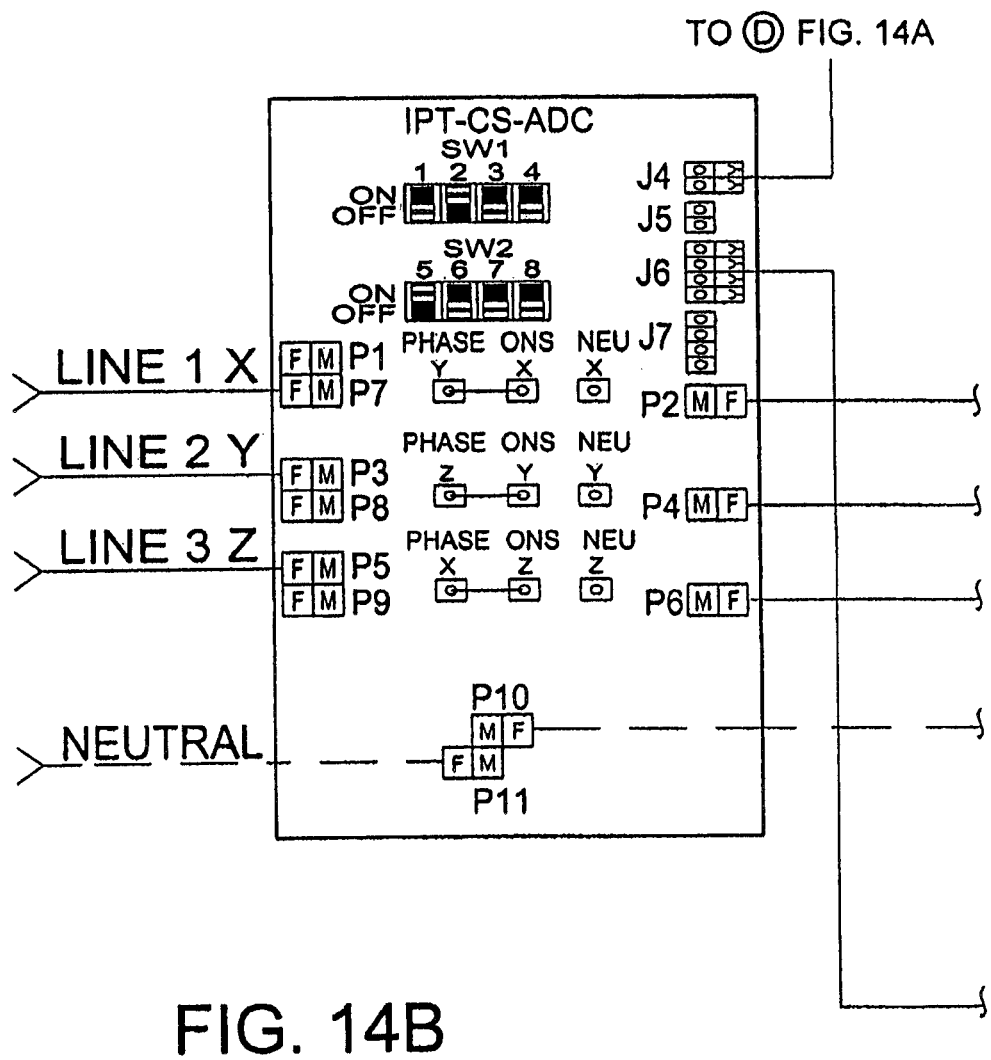
Figure 14D:
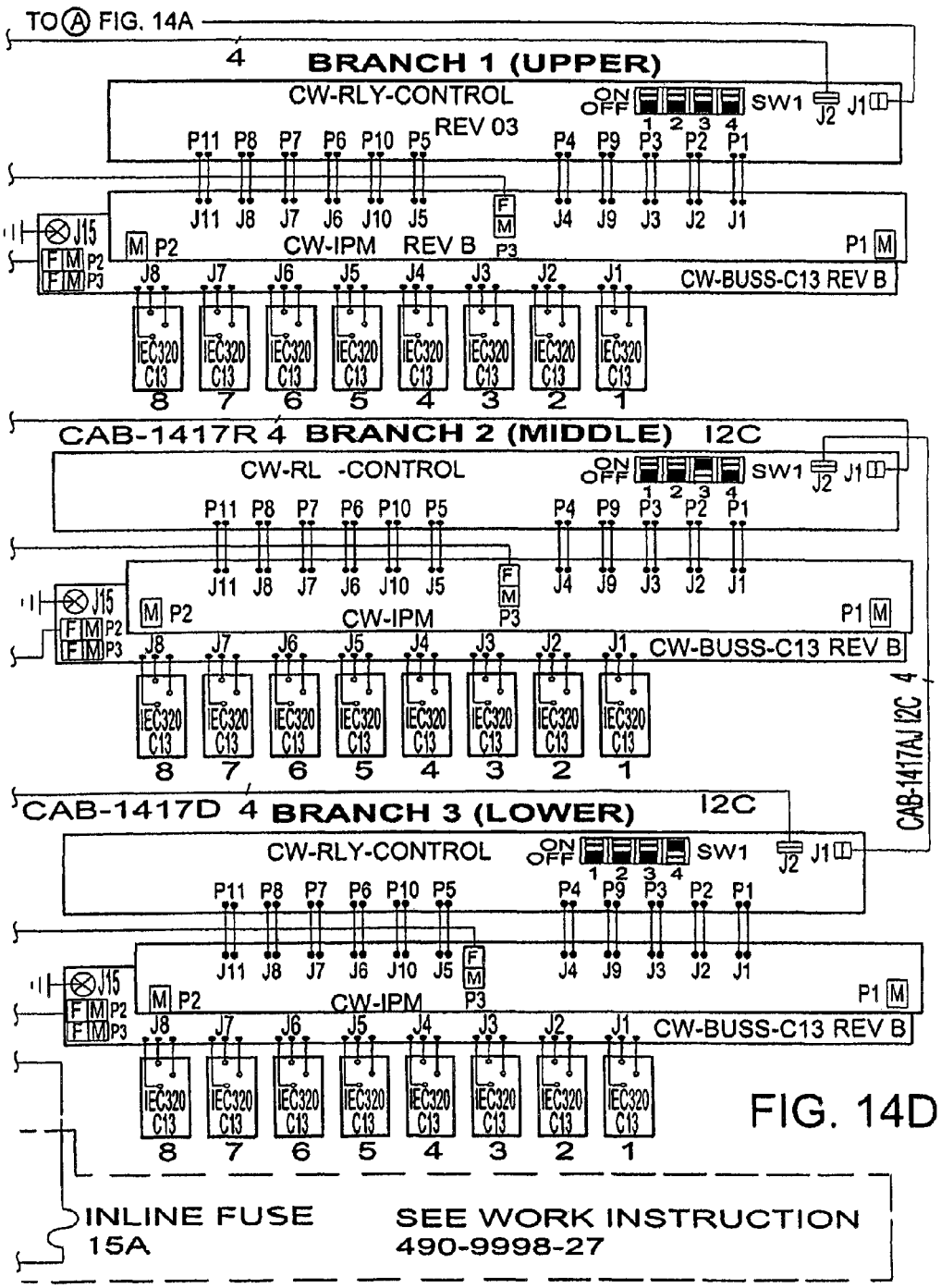

Referring to FIGS. 13A and 1313, a wiring schematic for the PDU component portion 100 is shown. Accordingly, a wire harness 900 including a grouping of wires corresponding to the wiring requirements shown in FIGS. 13A and 13B can be provided. As shown in FIG. 3, the wire harness 900 can include, for example: (1) wires 230, which electrically connect circuit protection module 114 with outlet modules 110, 112; (2) AC power line component wire 231, which electrically connects the line components of a power source with the circuit protection module 114; (3) AC power neutral component wires 385, which electrically connects the neutral component of the power source with the outlet modules 110, 112; (4) network communications cabling 233, which establishes a communications link between various modules of the component portion 120, such as the outlet modules 110, 112, circuit protection module 114, input power module 116, and display module 118.

The wires, such as one or more of the wires 230, 231, 233, 385, of the wire harness can include removable terminals, such as push-on female terminals or 4-pin push-on male terminals, at the respective ends of the wires. The male and female terminals are configured to removably or detachably receive corresponding female and male terminals, respectively, coupled to a printed circuit board, or other component of the PDU.

The terminals of the wires can be pushed onto the terminals mounted to printed circuit boards to electrically connect the wires and the terminals without soldering. Also, the terminals of the wires can be pulled out of engagement with the terminals of the printed circuit boards to electrically disconnect the wires and terminals without destruction or requiring excessive force.

Referring to FIGS. 14 and 14A-14D, and according to another embodiment, a wiring schematic for a PDU component portion having three outlet modules and configured to receive a three-phase power input is shown. Similar to wire harness 900, a wire harness that includes a grouping of wires corresponding to the wiring requirements shown in FIGS. 14 and 14A-14D can be provided to electrically interconnect the various components of the PDU.

Module Selection and PDU Assembly

Figure 15:
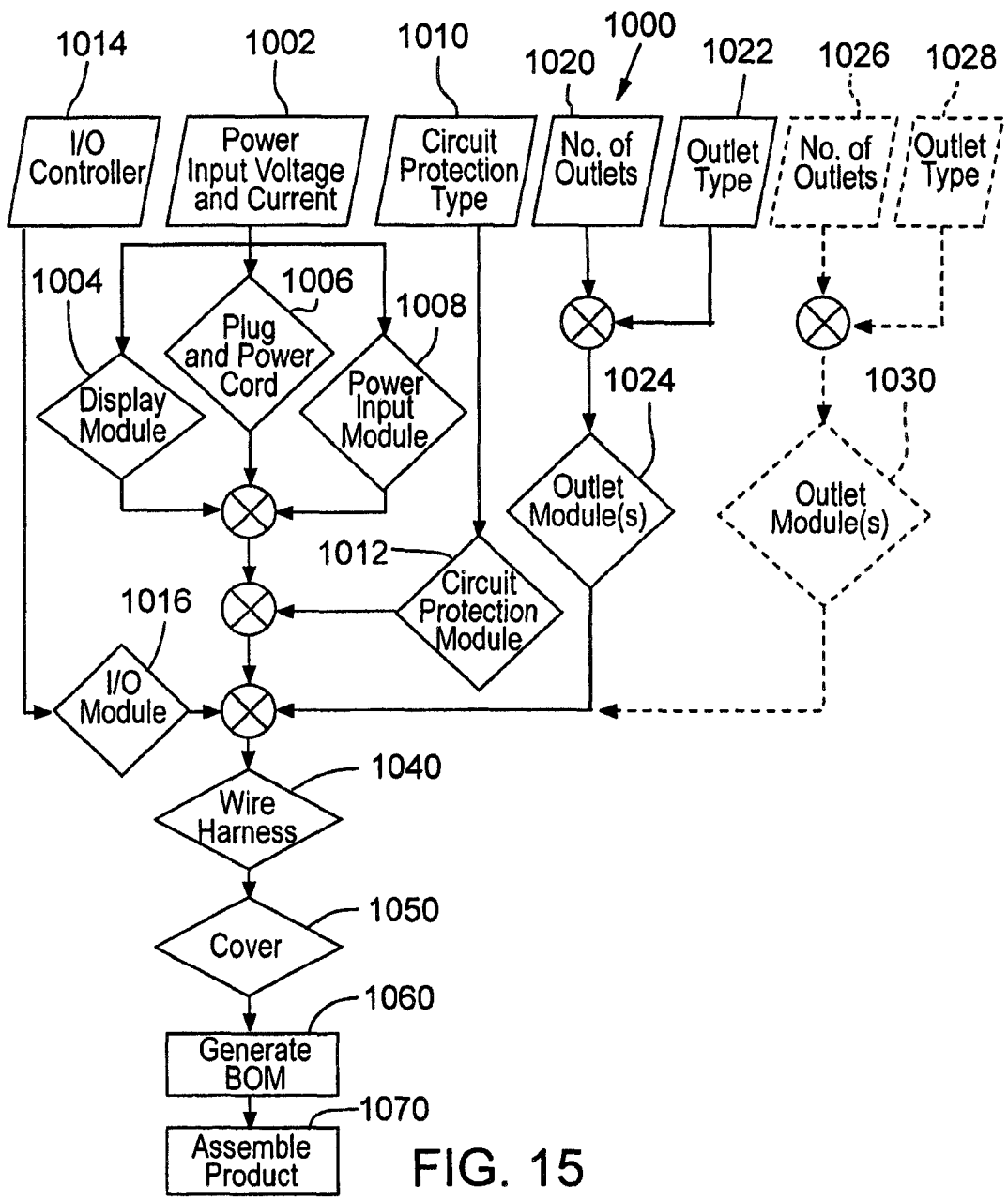
FIG. 15 is a flow chart illustrating one embodiment of a method for making a power distribution unit using modular construction techniques.

Referring now to FIG. 15, a flow chart illustrating one embodiment of a method for making a power distribution unit using modular construction techniques is shown. The method 1000 includes selecting various desired parameters and modules, as described above, based on, for example, the particular application for which the assembled PDU will be used and the particular standards accepted in the particular part of the world in which the PDU will be used.

A desired power input voltage and current is selected at step 1002. Typical input voltage can be, for example, 208V or 240V and typical input currents can be, for example, 20 A or 30 A. Based on the selected power input voltage and current, one of various display modules, such as display module 118 described above, is selected at step 1004, an appropriate plug and power cord is selected at step 1006; and one of various power input modules, such as power input module 116 described above, is selected at step 1008.

The type of circuit protection for the PDU is selected at step 1010. Such circuit protection can include, for example, fuse, fuse elements, fusible links, and circuit breakers. Based on the type of circuit protection selected, one or more of various circuit protection modules, such as circuit protection modules 114, 310, 500, 1100 described above, can be selected at step 1012. If a fuse-type circuit protection module is selected, such as modules 114, 310, 500, a desired one or more types of commercially available fuses, such as plug-in type, cartridge, or tube fuses, can be selected. Likewise, if a circuit breaker type circuit protection module is selected, such as module 1100, a desired one more types of commercially available circuit breakers, such as a single pole or dual pole ganged circuit breaker, can be selected. As described above, the circuit protection modules can have standardized components, such as standardized mounting structures, so that any one module can be replaced by or interchangeable with any other module. Such interchangeability provides an enhanced level of customization for adapting to various applications and environments.

The desired I/O controller for the PDU can be selected at step 1014. In some implementations, the desired I/O controller can be selected based on the particular environment in which the PDU will be used and the particular type of external devices to which the PDU can communicate and from which the PDU can receive communications. Based on the I/O controller selected in step 1014, one or more of various communications I/O modules, such as module 118, are selected at step 1016.

A desired number of outlets and outlet types are selected at steps 1020, 1022, respectively. The outlet types can be selected from any of various types of outlets, such as outlets complying with NEMA or TEC standards. Once the desired number and type of outlets are selected, one or more of various outlet modules, such as outlet modules 110, 112 described above, are selected at step 1024. Depending on the selected type and number of outlets, each outlet module can have more than one type of outlet and any number of outlets.

In some implementations, a second desired number of outlets and outlet types can be selected at steps 1026, 1028, respectively, and one or more of various outlets, which can be the same as or different than the module or modules selected at step 1024, can be selected at step 1030. In yet other implementations, the steps of selecting a desired number of outlets, outlet types and outlet modules can be performed any number of times to select any number of outlet modules, each with the same or different configurations, such that a desired configuration of outlets for the PDU is achieved.

Once a desired number of the above steps are performed, a desired wire harness, such as wire harness 900, is selected at step 1040, a desired PDU housing cover, such as PDU cover 124, is selected at step 1050.

Upon completion of step 1050, a bill of materials (BOM) is generated at step 1060. Typical manufacturing process for making a PDU begin with a predetermined BOM with the selection process being dependent on the BOM. In contrast, the described method of making a PDU having a modular construction, the manufacturing process is inverted such that the BOM is generated at the end of the design process, rather than at the beginning.

Once the BOM is generated at step 1060, the designed PDU can be assembled at step 1070. Assembly can be accomplished in any of a number of ways. For example, the various selected modules can be first structurally interconnected together and then electrically interconnected together. In the illustrated embodiments, the modules can be interconnected by arranging each of the modules in a leading end to trailing end configuration and removably attaching the leading ends of the modules with the trailing ends of adjacent modules and the trailing ends of the modules with the leading ends of adjacent modules.

Removable attachment of the modules with each other is dependent on the type of module connector being used. In the illustrated embodiments, the module connectors are tabs with apertures formed in the leading ends and apertures formed in the trailing ends. Accordingly, for these embodiments, adjacent modules are lined up such that the tabs of one module are received at least partially within the trailing end of an adjacent module. The respective apertures of the connection elements are aligned and a fastener is threadably received within the apertures to tighten the leading end to the trailing end. Each of the selected modules is interconnected in this manner until all the modules are coupled to each other to form the PDU component portion.

In other embodiments, the module connector elements can be any of various known connection methods, techniques, mechanisms, or devices. For example, in one embodiment, the module connector elements can be respective portions of a snap-fit arrangement. More specifically, the leading end of the modules can have a resilient tab portion and the trailing end of the modules can have a tab receiving aperture. In this embodiment, the modules can be removably coupled together by inserting the resilient tab portions into the tab receiving apertures. In other embodiments, for example, the module connector elements can be respective portions of a latching mechanism, hinged mechanism, or any other mechanism or arrangement having mating portions that are easily attached to each other and easily detached from each other. Module connector elements can be integral with, i.e., form a monolithic one piece construction with, the front panels of the modules, attached to the front panels of the modules, or attached to one or more other portions of the modules.

Once the modules are physically linked together, the modules can be electrically linked together by connecting the wires of the wire harness to corresponding terminals on the modules. For example, the terminals at respective ends of the wires can be manually pushed onto respective terminals of one or more modules to electrically connect the terminals.

Once the modules are electrically linked together, the PDU component portion can be positioned within and secured, such as removable fasteners, to the selected PDU cover to form the PDU.

An assembled PDU can be easily reconfigured by replacing, adding or removing modules without damage to or destruction of the power distribution unit, the existing modules, the replaced module, or any new modules. For example, if replacement of an existing module by a new module is desired, the user can loosen the fasteners of the PDU cover and remove the PDU component portion. The user can then detach or unplug the wires connected to the terminals of the existing module. Once the module is electrically disconnected from adjacent modules, the user can loosen the fasteners, or otherwise release the coupling mechanism or mechanisms, that couple the mating module connector elements together and manually remove the existing module from the PDU component portion. The user can then align the new module such that the mating portions of the module connector elements are engaged, such as aligning respective apertures of the elements, and secure the portions together, such as by tightening respective fasteners extending through the apertures. The disconnected wire terminals can then be reconnected to the terminals of the new module and the PDU component portion can be reinserted into and secured to the PDU panel to form a reconfigured PDU.

Alternative Embodiments

In other embodiments, the PDU includes one or more modular features removably mounted within an aperture formed in a PDU housing. The PDU can be assembled by removably securing the modules within the PDU housing or, more specifically, within the apertures of the housing. For example, if a first outlet module is selected, a PDU housing can be selected that has an outlet module aperture sized and shaped to matingly receive and removably secure the first outlet module at least partially within the aperture. Further, by way of example, if a first circuit protection module is selected, the PDU housing can also have a circuit protection module aperture sized and shaped to matingly receive and removably secure the first circuit protection module at least partially within the aperture. The selected PDU housing can also include other apertures for matingly receiving and removably securing any of the other various selected modules.

In some embodiments, the modules can each include a self-contained housing having a front wall, a rear wall, and four sidewalls intermediate the front wall. The front wall can have various components coupled thereto, such as outlets in the case of outlet modules, communications ports in the case of communications I/O modules, circuit protection components in the case of circuit protection modules. Terminals electrically coupled to various components of the respective modules can extend from the rear wall and be accessible from outside the housings.

The PDU can include one or more fixed terminal receptacles mounted within the PDU housing below the apertures formed in the housing. The receptacles are configured to receive, and be electrically coupled to, the terminals of the modules. Each receptacle can be electrically coupled to other various receptacles within the PDU housing via conductive elements, such as wires and circuit boards.

In assembly or reconfiguration, the modules can be inserted into respective apertures in the PDU housing such that the respective terminals engage the receptacles positioned below the apertures. In this manner, the modules can be electrically connected to other modules and components within the housing. The modules can be electrically disconnected from the receptacles by removing the housings from the apertures. A different or replacement module can then be inserted into the vacant aperture, plugged into the corresponding receptacles, and electrically coupled to the other modules and components of the PDU.

In view of the many possible embodiments to which the principles of the disclosed PDU may be applied, it should be recognized that the illustrated embodiments are only examples and should not be taken as limiting the scope of the disclosed PDU. Rather, the scope is defined by the following claims. We therefore claim as our invention all that comes within the scope and spirit of these claims.

What is claimed is:

1. A power distribution unit vertically mountable in an electronic equipment rack and configured to distribute power to equipment in the rack, comprising:
    a housing including an interior cavity;
    and
    a plurality of coupled modules removably secured to the housing at least partially within the interior cavity, comprising at least one outlet module, at least one power input module, and one or more of a circuit protection module, a communications I/O module, and a display module;
    each of said modules comprising a first end having a connection element of a first type and a second end having a connection element of a second type mateable with connection elements of the first type; said modules being removably secured to each other via mateable engagement between connection elements of the first type and connection elements of the second type in a first end to second end configuration.

2. A power distribution unit according to claim 1 wherein each of said modules comprises at least one connection element and is removably secured to one or more other of said modules via said at least one connection element.

3. A power distribution unit according to claim 1, wherein the modules are aligned in an end-to-end configuration.

4. A power distribution unit according to claim 1, wherein the at least one power input module comprises a polyphase power input.

5. A power distribution unit according to claim 4, wherein the display module is configured to display information related to each of the power phases of said polyphase power input.

6. A power distribution unit according to claim 4, wherein the plurality of coupled modules includes a display module comprises current indicator displays for each power phase of said polyphase power input.

* * * * *

UNITED STATES PATENT AND TRADEMARK OFFICE
CERTIFICATE OF CORRECTION

PATENT NO. : 8,619,412 B2  
APPLICATION NO. : 13/195838  
DATED : December 31, 2013  
INVENTOR(S) : Carrel W. Ewing et al.

Page 1 of 2

It is certified that error appears in the above-identified patent and that said Letters Patent is hereby corrected as shown below:

In the Drawings

On sheet 14 of 17, in Figure 14C, line 14, delete "AUXILLARY" and insert -- AUXILIARY --, therefor.

In the Specification

In column 6, line 2-3, delete "NEMA type" and insert -- NEMA-type --, therefor.

In column 6, line 10, delete "PDU" and insert -- PDU. --, therefor.

In column 8, line 5, delete "130" and insert -- 131 --, therefor.

In column 9, line 64, delete "shown;" and insert -- shown, --, therefor.

In column 10, line 23, delete "NEMA type" and insert -- NEMA-type --, therefor.

In column 17, line 66, delete "that," and insert -- that --, therefor.

In column 18, line 17, delete "min" and insert -- or in --, therefor.

In column 19, line 59, delete "first," and insert -- first --, therefor.

In column 22, line 46, delete "housing" and insert -- housing using --, therefor.

In column 23, line 55, delete "112" and insert -- 1112 --, therefor.

In column 24, line 7, delete "1 16" and insert -- 1116 --, therefor.

Signed and Sealed this  
Fifteenth Day of March, 2016

Michelle K. Lee  
*Director of the United States Patent and Trademark Office*

CERTIFICATE OF CORRECTION (continued)
U.S. Pat. No. 8,619,412 B2

In column 25, line 18, delete "module;" and insert -- module, --, therefor.

In column 25, line 29-30, delete "1 147" and insert -- 147 --, therefor.

In column 27, line 2, delete "1313," and insert -- 13B, --, therefor.

In column 27, line 57, delete "1006;" and insert -- 1006, --, therefor.

In column 28, line 25, delete "TEC" and insert -- IEC --, therefor.